(12) United States Patent
Matsuyama et al.

(10) Patent No.: US 8,075,400 B2
(45) Date of Patent: Dec. 13, 2011

(54) GAME APPARATUS

(75) Inventors: Shigenobu Matsuyama, Minato-ku (JP); Ryo Ueda, Kobe (JP); Toru Takeda, Osaka (JP)

(73) Assignee: Konami Digitalk Entertainment Co., Ltd., Tokyo (JP)

( * ) Notice: Subject to any disclaimer, the term of this patent is extended or adjusted under 35 U.S.C. 154(b) by 1183 days.

(21) Appl. No.: 11/632,022

(22) PCT Filed: Jun. 23, 2005

(86) PCT No.: PCT/JP2005/011519
§ 371 (c)(1),
(2), (4) Date: Jan. 8, 2007

(87) PCT Pub. No.: WO2006/006362
PCT Pub. Date: Jan. 19, 2006

(65) Prior Publication Data
US 2008/0032796 A1  Feb. 7, 2008

(30) Foreign Application Priority Data

Jul. 12, 2004 (JP) ................................. 2004-205083
Jul. 12, 2004 (JP) ................................. 2004-205087

(51) Int. Cl.
*A63F 9/24* (2006.01)
*A63F 13/00* (2006.01)
(52) U.S. Cl. ................. 463/37; 463/30; 463/36; 463/46
(58) Field of Classification Search ............... 463/36, 463/37, 30, 46; 434/55
See application file for complete search history.

(56) References Cited

U.S. PATENT DOCUMENTS

| 4,461,470 A * | 7/1984 | Astroth et al. ................. 472/60 |
| 5,951,404 A * | 9/1999 | Oishi et al. ..................... 472/60 |
| 6,752,716 B1 | 6/2004 | Nishimura et al. |
| 6,931,596 B2 * | 8/2005 | Gutta et al. .................. 715/728 |
| 2003/0130031 A1 | 7/2003 | Yoshida et al. |

FOREIGN PATENT DOCUMENTS

| CN | 1243448 | 2/2000 |
| EP | 0 970 730 | 1/2000 |
| GB | 2 306 272 | 4/1997 |
| JP | 6-9621 | 2/1994 |
| JP | 7-275505 | 10/1995 |
| JP | 2921485 | 4/1999 |
| JP | 11-258973 | 9/1999 |
| JP | 2001-204956 | 7/2001 |
| JP | 2002-325968 | 11/2002 |
| WO | WO- 02/069609 | 9/2002 |

* cited by examiner

*Primary Examiner* — Peter DungBa Vo
*Assistant Examiner* — Jasson Yoo
(74) *Attorney, Agent, or Firm* — Jordan and Hamburg LLP

(57) ABSTRACT

A game machine comprises a monitor for displaying a screen image for prompting a manipulation input, a control panel unit provided with push buttons and adapted to accept manipulations from a game player so as to make progress on a game, a movement mechanism unit disposed at a bottom of a base segment to provide turning and traveling to the control panel unit, an apparatus-body drive control section 107 for controlling the drive of the movement mechanism unit, and a control instruction section or for outputting a given drive control instruction generated during game play to the drive control section, whereby a motion for positional displacement of a manipulation input unit is instructed in line with a game progress or a game result to exert an influence on a difficulty level of a game so as to enhance amusement of the game.

24 Claims, 13 Drawing Sheets

GAME APPARATUS

TECHNICAL FIELD

The present invention relates to a game apparatus equipped with a manipulation input unit for accepting a manipulation from a game player, and a manipulation guide unit for providing a guidance of prompting a manipulation input.

BACKGROUND ART

Heretofore, there has been known a so-called whack-a-mole game in which a plurality of holes are provided, and a mock-mole character is designed to randomly appears from each of the holes only for a short time, wherein a game player plays a game by whacking the character during appearance by a whacking member. The following Patent Publication 1 discloses a game machine for playing a shooting game with a game player, which comprises a machine housing formed by simulating a human body and adapted to be turned about a vertical axis, and a dummy gun, wherein the machine housing is designed to be oriented to aim the dummy gun at the game player during attack and to be entirely turned so as to be oriented backwardly to avoid an attack from the dummy gun of the game player.

The whack-a-mole game is configured to simply provide two states: one state in which the mock character hides in the hole, and the other state in which a part of the mock character appears from the hole, to a game player one-sidedly according to a predetermined appearance program, and therefore has a certain limit in providing a game with satisfactory enjoyment/amusingness. The shooting game disclosed in the Patent Publication 1 is configured to simply provide a turning motion about the vertical axis to the machine housing. While a certain level of game-enjoyment can be found in a point of controlling the turning motion depending on whether a game player is present or absent, as compared with the whack-a-mole game, the control is not directly associated with the content of a play of a game player.

[Patent Publication 1] Japanese Patent Laid-Open Publication No. 7-275505.

DISCLOSURE OF THE INVENTION

In order to solve the above problems, the present invention provides a game apparatus which comprises a manipulation input unit for accepting an external manipulation to make progress on a game, a manipulation guide unit for providing a guidance of prompting a manipulation input to the manipulation input unit, a movement mechanism unit for providing a positional displacement to the manipulation input unit, drive control means for controlling the drive of the movement mechanism unit, and control instruction means for generating a given drive control instruction during game play and outputting the generated drive control instruction to the drive control means.

In the above game apparatus, a game player performs a manipulation to the manipulation input unit (plays a game) while looking at a guidance of the manipulation guide unit, to make progress on a game. Then, the control instruction means determines a given status during game play, and issues an instruction for a positional displacement of the manipulation input unit according to the determination result at that time or moment to moment. The positional displacement of the manipulation input unit can create a change in difficult level of the manipulation input by the game player to enhance game player's enjoyment.

Preferably, the control instruction means comprises manipulation-input-state determination means for determining a state of manipulation to the manipulation input unit, and outputting a drive control instruction corresponding to a result of the determination result, to the drive control means.

In this game apparatus, a game player performs a manipulation to the manipulation input unit (plays a game) while looking at a guidance of the manipulation guide unit, to make progress on a game. Then, the manipulation-input-state determination means determines a state of manipulation accepted through the manipulation input unit, i.e., a state of manipulation input by the game player, and issues an instruction for a positional displacement of the manipulation input unit according to the determination result at that time or moment to moment. The positional displacement of the manipulation input unit can create a change in difficult level of the manipulation input by the game player so as to enhance game player's enjoyment.

In the above game apparatus, the motion for positional displacement may include either one of a plurality of motions consisting of a turning motion causing a change in orientation of the manipulation input unit and a traveling motion (at least one of forward/backward, rightward/leftward and diagonal motions) causing a locational change, and a complicate motion consisting of a simultaneous motion of turning and traveling. In an embodiment where the movement mechanism unit employs a telescopic mechanism for achieving an upward/downward motion, the motion for positional displacement may further include an upward/downward motion, i.e., upward/downward traveling.

The state of manipulation input may include a state in which no manipulation input is performed by a game player, and a certain drive (e.g., an operation for prompting a game player to input) may be executed in response to no manipulation input.

Preferably, the control instruction means comprises game-status determination means for determining a game status, and outputting a drive control instruction corresponding to a result of the determination, to the drive control means.

In this game apparatus, a game player performs a manipulation to the manipulation input unit (plays a game) while looking at a guidance of the manipulation guide unit, to make progress on a game. Then, the game-status determination means determines a status of the game according to the manipulation input by the game player, and issues an instruction for a positional displacement of the manipulation input unit according to the determination result at that time or moment to moment. The manipulation input unit is positionally displaced according to the game status, and thereby the difficult level of the manipulation input by the game player is changed to exert an influence on a subsequent game status so as to enhance game player's enjoyment.

In the above game apparatus, the motion for positional displacement may include either one of a plurality of motions consisting of a turning motion causing a change in orientation of the manipulation input unit and a traveling motion (at least one of forward/backward, rightward/leftward and diagonal motions) causing a locational change, and a complicate motion consisting of a simultaneous motion of turning and traveling. In an embodiment where the movement mechanism unit employs a telescopic mechanism for achieving an upward/downward motion, the motion for positional displacement may further include an upward/downward motion.

The game status means at least either one of a game status during game play and a game status at a time when a game is terminated. In case of the game status during game play, the manipulation input unit is positionally displaced during game play in response to a given condition of a game progress, such as a favorable development or an unfavorable development to a game player; an elapsed time from start of a game; a change in stage when the game consists of a plurality of stages; or a score corresponding to a play ability; or a combination thereof; or a remaining number of game plays when a fee for a plural number of game plays has been paid in a lump to continuously play games. Thus, in addition to a change in difficulty level of a game, an unpredictable motion to a game player can be performed to provide a game with a higher level of game-enjoyment. In case of the game status at a time when a game is terminated, the manipulation input unit is positionally displaced, for example, in response to success or failure of the game, an obtained score, a required time in a game configured to compete on a time, or success or failure in clearing a given condition. This makes it possible to provide a game with enhanced unpredictability and amusingness in line with a game result.

BEST MODE FOR CARRYING OUT THE INVENTION

Figure 1:
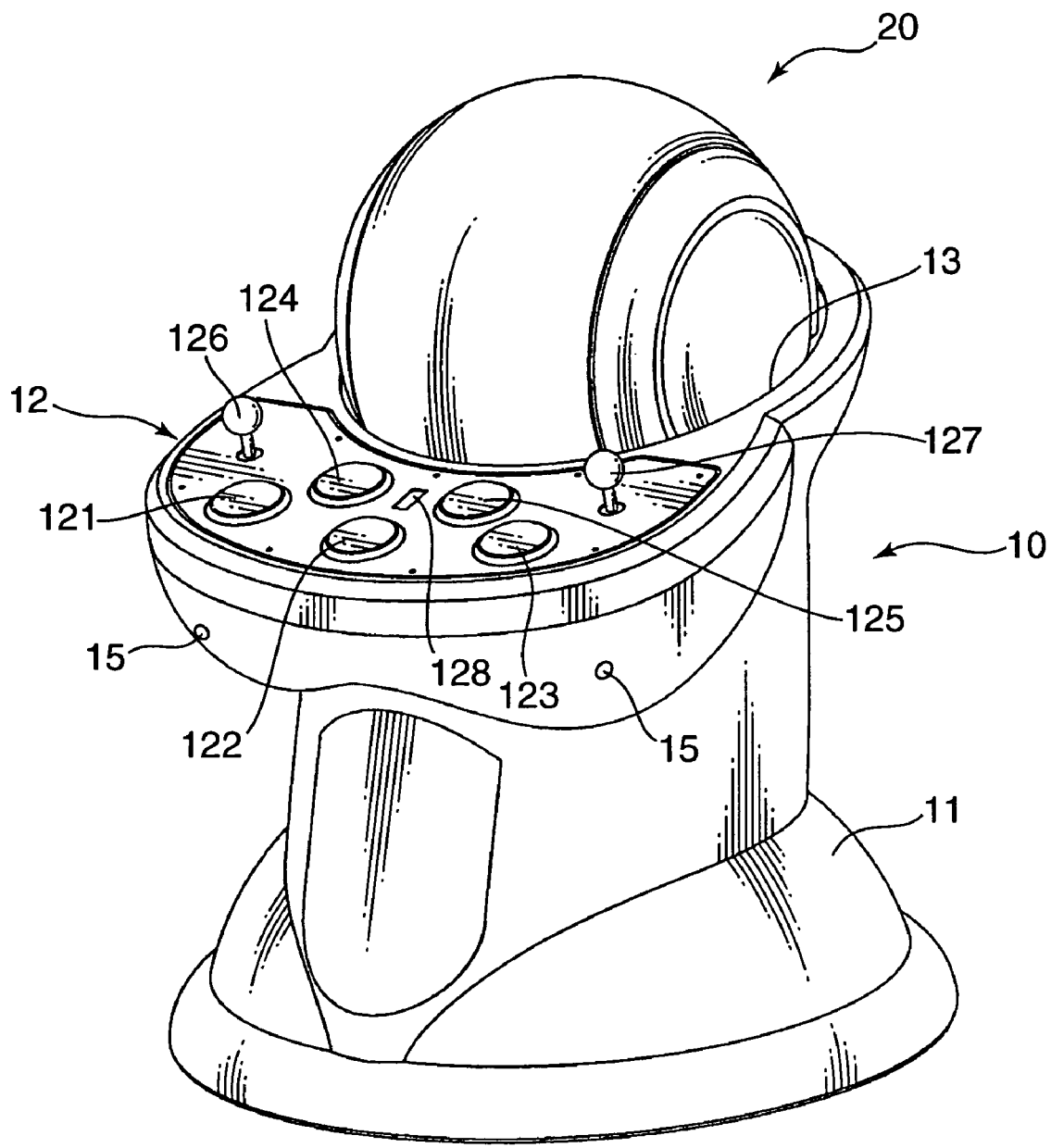
FIG. 1 is an external perspective view showing a game apparatus according to one embodiment of the present invention.
Figure 2A:
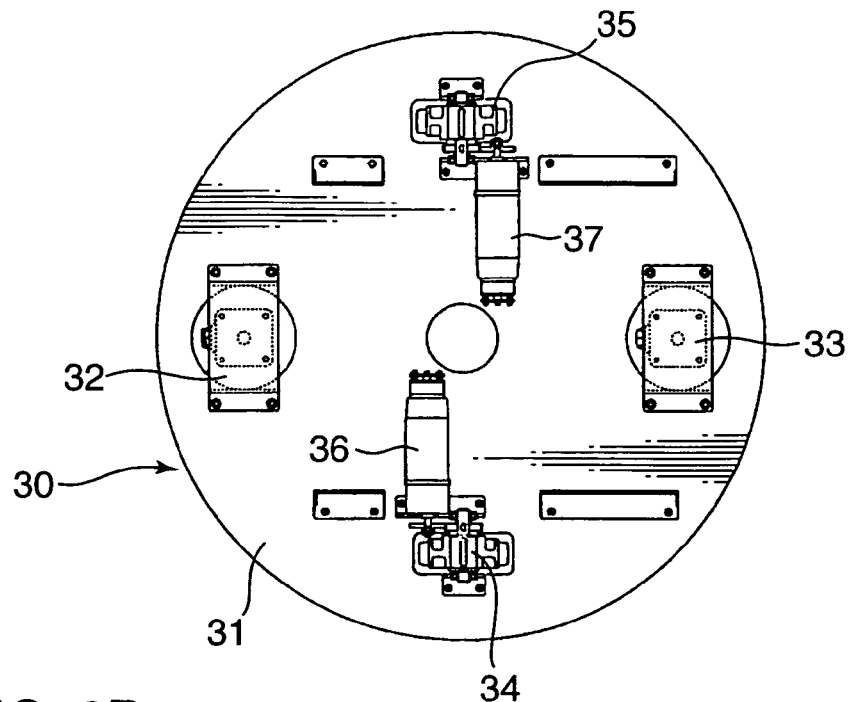
FIG. 2A is a diagram showing a bottom of the game apparatus when viewed from the side of an upper surface thereof.
Figure 2B:
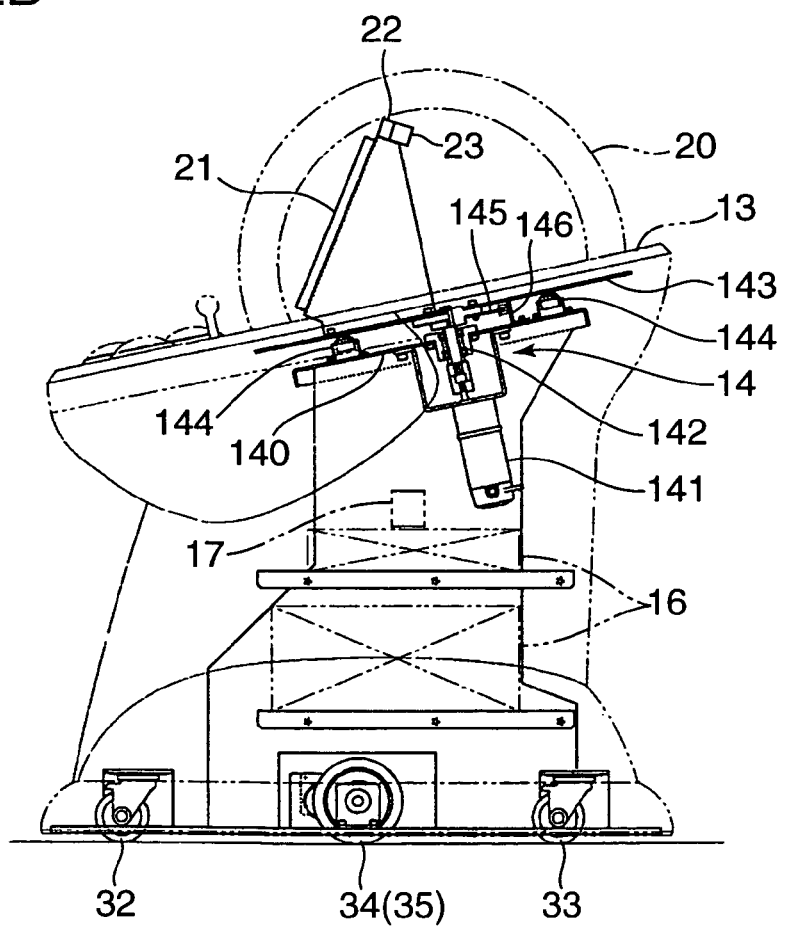
FIG. 2B is a side sectional view of the game apparatus.

FIG. 1 is an external perspective view showing a game apparatus according to one embodiment of the present invention. FIG. 2A is a diagram showing a bottom of the game apparatus when viewed from the side of an upper surface thereof, and FIG. 2B is a side sectional view of the game apparatus. In FIG. 1, the game apparatus has an apparatus body which comprises a base segment 10 on a lower side thereof, and a top segment 20 supported by an upper portion of the base segment 10. In this embodiment, the base segment 10 and the top segment 20 are designed to simulate a torso and a head, respectively, and formed as a robot presenting an image of an anthropomorphic character as a whole. The top segment 20 is made of a plastic material or the like, and formed, in this embodiment, in an approximately semispherical shape (or dome shape) which internally has a hollow space.

The base segment 10 is made of a reinforced plastic material or the like to have a generally cylindrical shape, and a lower portion thereof is radially enlarged in consideration of postural stability of the apparatus body to form a large-diameter portion 11. An upper portion of the base segment 10 has a front region formed as a control panel unit 12 which has an approximately horizontal surface or a surface inclined slightly downwardly toward a front edge thereof as shown in FIG. 2B to serve as a manipulation input unit, for example, in such a manner as to protrude frontwardly. An upper end of the base segment 10 located on a rearward side of the control panel unit 12 is formed with a circular-shaped opening 13 which is flush with a surface of the control panel unit 12, and a turnably-supporting structure 14 is installed inside the opening 13 to turnably support the top segment 20. The base segment 10 has a sensor 15 designed to have a given directivity, and attached in a plurality of positions of a lateral surface thereof (in this embodiment, total four positions on right and left sides of a front lateral surface and on right and left sides of a rear lateral surface) at an appropriate height so as to detect a game player. This sensor 15 may be an ultrasonic sensor or an optical sensor comprising a light-emitting element and a light-receiving element, which is adapted to detect whether an obstacle located within a given distance (a human body moving closer thereto and away therefrom) is present or absent. Alternatively, a pyroelectric sensor adapted to sense a heat ray from a human body moving closer thereto, or image pickup means such as a CCD camera, may also be used as the sensor 15.

Further, the base segment 10 is internally equipped with a circuit board unit 16 which comprises a controller for driving the game apparatus. In this embodiment, a magnetic sensor 17 is installed inside the base segment 10 to allow an absolute orientation of the base segment 10 to be detected. A horizontal bottom plate 31 is fixed to a bottom of the base segment 10, and a movement mechanism unit 30 is attached to the bottom plate 31.

The control panel unit 12 has a manipulation surface having a given flatness (in this embodiment, an approximately semicircular shape). On the manipulation surface, the control panel unit 12 is provided with a front row of three push buttons 121, 122, 123, a rear row of two push buttons 124, 125, and two joysticks 126, 127 disposed on respective opposite sides of the manipulation surface and each designed to accept a direction instruction based on a tilting manipulation and detect a direction of the tilt movement so as to serve as a direction instruction member. Further, a coin slot 128 is formed in a central region of the manipulation surface. Although not illustrated in FIG. 1, a coin counter or the like is disposed below the coin slot.

As each of the push buttons 121 to 125, a conventional push button structure is employed which comprises a button body hidden from view in FIG. 1, and a head (pushable member) attached to an upper portion of the button body in a vertically movable manner by a small distance and designed to be biased upwardly by a biasing member, such as a coil spring (not shown), so as to protrude from the manipulation surface. Each of the push buttons 121 to 125 is internally provided with a switch (121S to 125S; see FIG. 4) adapted to detect that it is pushed downwardly against biasing means due to a pushing manipulation (or whacking manipulation) by a game player. In this embodiment, the push buttons 121, 122, 123 are colored, respectively, with different colors, such as red, blue and yellow, and each of the push buttons 124, 125 is colored while (milk white). In addition to the switches 121S to 125S, each of the push buttons 121 to 125 is internally provided with a light-emitting member (121L to 125L; see FIG. 4) adapted to generate white light. These light-emitting members 121L to 125L are used for guiding and prompting a game player to perform a manipulation as described later.

The joysticks 126, 127 are used for making a selection between plural types of games and various conditions before start of a game, and for giving an instruction on direction during game play depending on the type of game.

As shown in FIG. 2B, the turnably-supporting structure 14 comprises a base plate 140 attached to the upper portion of the base segment 10, a drive motor 141 attached to a lower portion of the base plate 140, a turnable plate 143 which is attached to a rotation shaft 142 of the drive motor 141 protruding upwardly through a through-hole formed at a center of the base plate 140, and disposed parallel to the base plate 140, and a plurality of support rollers 144 (casters) which are disposed along a circumferential direction of the base plate 140, preferably, at even intervals, to support a lower surface of the turnable plate 143 in contact manner so as to ensure a smooth turning of the turnable plate 143 to serve as a support member. As the support member of the turnable plate 143, a combination of an annular-shaped guide rail and a plurality of ball members adapted to roll along the guide rail may be disposed in opposed relation to each of the base segment 10 and the turnable plate 143.

The top segment 20 is fixedly mounted on the turnable plate 143. Specifically, the top segment 20 is attached onto the turnable plate 143 in such a manner that a spherical center of the top segment 20 is located on an axis of the rotation shaft 142. A monitor 21 composed, for example, of an LCD, is disposed in the hollow space of the top segment 20 and on the side of an upper surface of the turnable plate 143, to display an image so as to serve as a manipulation guide unit. The monitor 21 has a screen which is oriented in a direction conforming to a frontward direction of the turnable plate 143, and inclined upwardly to extend in a direction approximately orthogonal to a horizontal direction or a visual line of a game player having an average body height during game play. The monitor 21 as the manipulation guide unit is operable not only to prompt a game player to perform a manipulation of the control panel unit 12 as the manipulation input unit, i.e., play a game, but also to display a result of the manipulation.

A detection-target protruding piece 145 is attached at one position of a peripheral end of the turnable plate 143. Correspondingly, a light-emitting element and a light-receiving element are attached to the base plate 140 in such a manner as to be disposed on both sides of a turning locus of the detection-target protruding piece 145 to form a photo interrupter 146 serving as a turning sensor. The turnable plate 143, i.e., the top segment 20, is arranged in such a manner as to be oriented frontwardly at a position where the photo interrupter 146 detects the detection-target protruding piece 145. Thus, even if the top segment 20 is turned rightwardly or leftwardly, it can be accurately returned to the frontwardly oriented position.

The top segment 20 is formed with a pattern in opposite lateral regions thereof in a state when the turnable plate 143 is located at the frontwardly oriented position. In contrast, a front region of the top segment 20 is formed to be semi-transparent or transparent so as to provide high visibility of a manipulation guide image to be displayed on the screen of the monitor 21 becomes. Thus, when the top segment 20 is turned and oriented laterally, the visibility of the screen image of the monitor becomes lower, and therefore a difficulty level of a game can be increased. An infrared light-emitting element 22 for detecting position and an infrared light-receiving element 23 for receiving positional information, each of which has a relatively wide directionality, are provided in the inner space of the top segment 20.

Although not illustrated in the figures, a protrusion is attached on a lower surface of a front end of the turnable plate 143 at the frontwardly oriented position, and a stopper made of an elastic material is provided on the base segment 10 at an appropriate position, for example, at two positions where the front end of the turnable plate 143 is turned rightwardly and leftwardly by 120 degrees. Thus, when the turnable plate 143 is turned rightwardly or leftwardly from at the frontwardly oriented position by 120 degrees, the protrusion comes into contact with the stopper, and restricted in turning. This makes it possible to adequately drive the monitor 21 irrespective of the turning only by setting dimensions of signal and power lines to the monitor at values capable of absorbing twists caused by the turning of the turnable plate 143.

The movement mechanism unit 30 is mounted to the circular bottom plate 31 fixed to the base segment 10 in a horizontal posture. Two casters 32, 33 having a 360-degree rotatable ball (rolling element) are attached to the bottom plate 31 at opposite front and rear positions thereof. A part of each ball of the casters 32, 33 is exposed downwardly from a lower surface of the bottom plate 31 through a cutout of the bottom plate 31. Further, two rollers (rotatable members) 34, 35 are attached to the bottom plate 31 at opposite right and left positions in such a manner as to be oriented in the frontward/rearward direction. A part of each of the rollers 34, 35 is exposed downwardly from a lower surface of the bottom plate 31 through a cutout of the bottom plate 31, and a height of the exposed portion is set at a value equal to or slightly less than that of the lower end of each ball of the casters 32, 33. Thus, the balls and the rollers allow the game apparatus to stand upright relatively to a floor in a stable posture, and travel on the floor. When a structure designed to change an orientation of the rollers is employed, the mounting positions of the rollers are not limited to the right and left positions of the bottom plate 31, but may, for example, be opposite front and rear positions of the bottom plate 31.

Two drive motors 34, 35 are attached onto an upper surface of the bottom plate 31, for example, in a horizontal posture, and output shafts of the drive motors 34, 35 are connected to respective rotation shafts of the rollers 34, 35 directly or via a given reduction gear or the like. Although not illustrated in FIG. 2, two rotary encoders 361, 371 (see FIG. 4) are attached to the respective output shafts of the drive motors 36, 37, so that an accumulated number of rotations in each of the drive motors 36, 37 can be detected.

Figure 3:
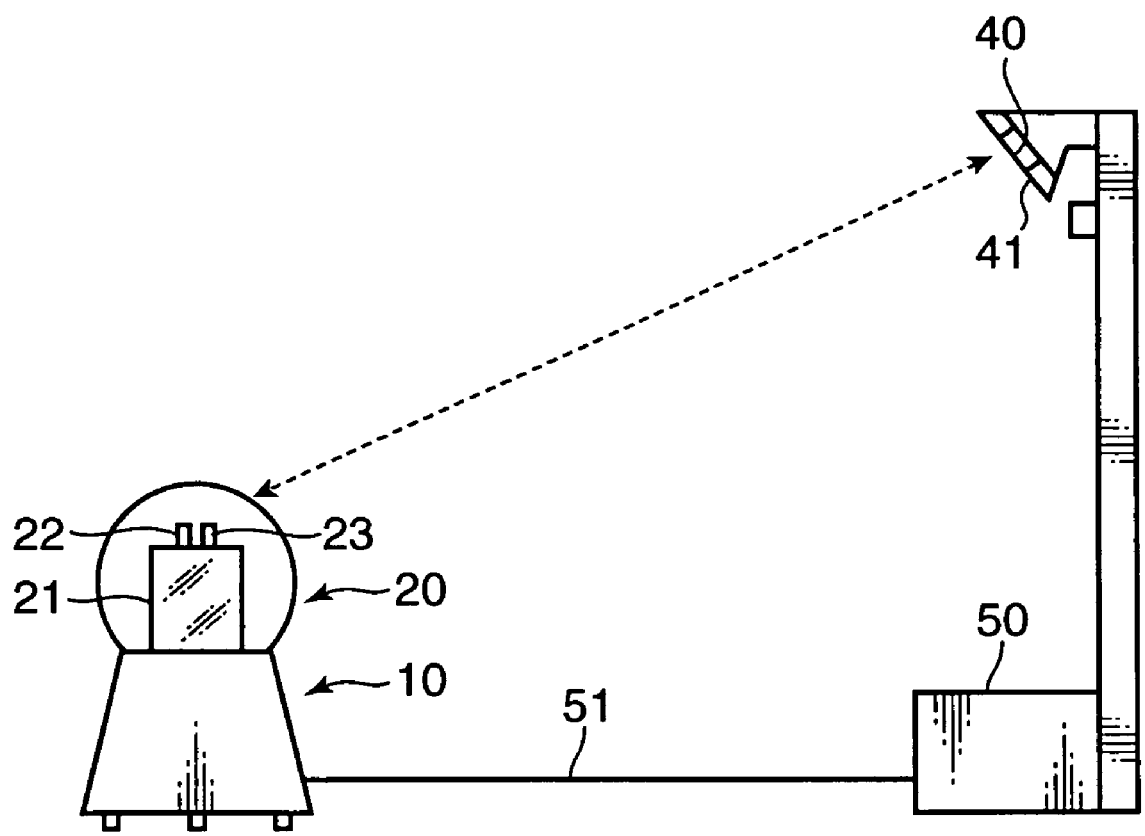
FIG. 3 is an explanatory diagram of a position detection of the game apparatus.

FIG. 3 is an explanatory diagram of a position detection of the game apparatus. The orientation and position of the game apparatus are detected based on detention information from the magnetic sensor 17 and the rotary encoders 361, 371, as shown in FIG. 2. In this case, in view of slip between a floor and each of the rollers 34, 35, a position error will be accumulated in a long-term operation, and therefore it is not always guaranteed to correctly detect the position. In this embodiment, a technique of remote monitoring from outside is employed as shown in FIG. 3. Specifically, in FIG. 3, a CCD camera unit 40 serving as image pickup means which has a predetermined field of view, and an infrared light-emitting element 41 serving as communication means, are disposed at a height position capable of obtaining a bird's-eye view of the game apparatus. The CCD camera unit 40 is operable to pick up light from the infrared light-emitting element 22 of the game apparatus and detect a position of the infrared light-emitting element 22 as coordinates of a luminescent spot in obtained image data, and the infrared light-emitting element 41 is operable to transmit the spot coordinates to the game apparatus. The spot-coordinate information emitted from the infrared light-emitting element 41 after light modulation is received by the infrared light-receiving element 23, and then a position of the light source, i.e., a spatial position (position on a horizontal plane) of the game apparatus is calculated based on the received spot-coordinate information by an after-mentioned controller 100 (see FIG. 4).

This external monitoring dada is secondarily used for the detection information from the magnetic sensor 17 and the rotary encoder 361, 371, so that an accumulated error can be reset on a periodic basis or according to need. Further, two infrared light-emitting elements 22 may be arranged in the game apparatus in the frontward/rearward direction, and a turn-on/off pattern, for example, a blinking cycle, may be set differently therebetween, to allow the frontward/rearward direction to be recognized so as to detect an orientation of the game apparatus. In this case, the magnetic sensor 17 becomes unessential.

In FIG. 3, a power supply unit 50 is provided as a means to generate electric power required for each drive source in the game apparatus, and the generated power is supplied through a power feed cable 51 having a desired length. The game apparatus can be positionally displaced freely within the range of the length of the power feed cable 51.

Figure 4:
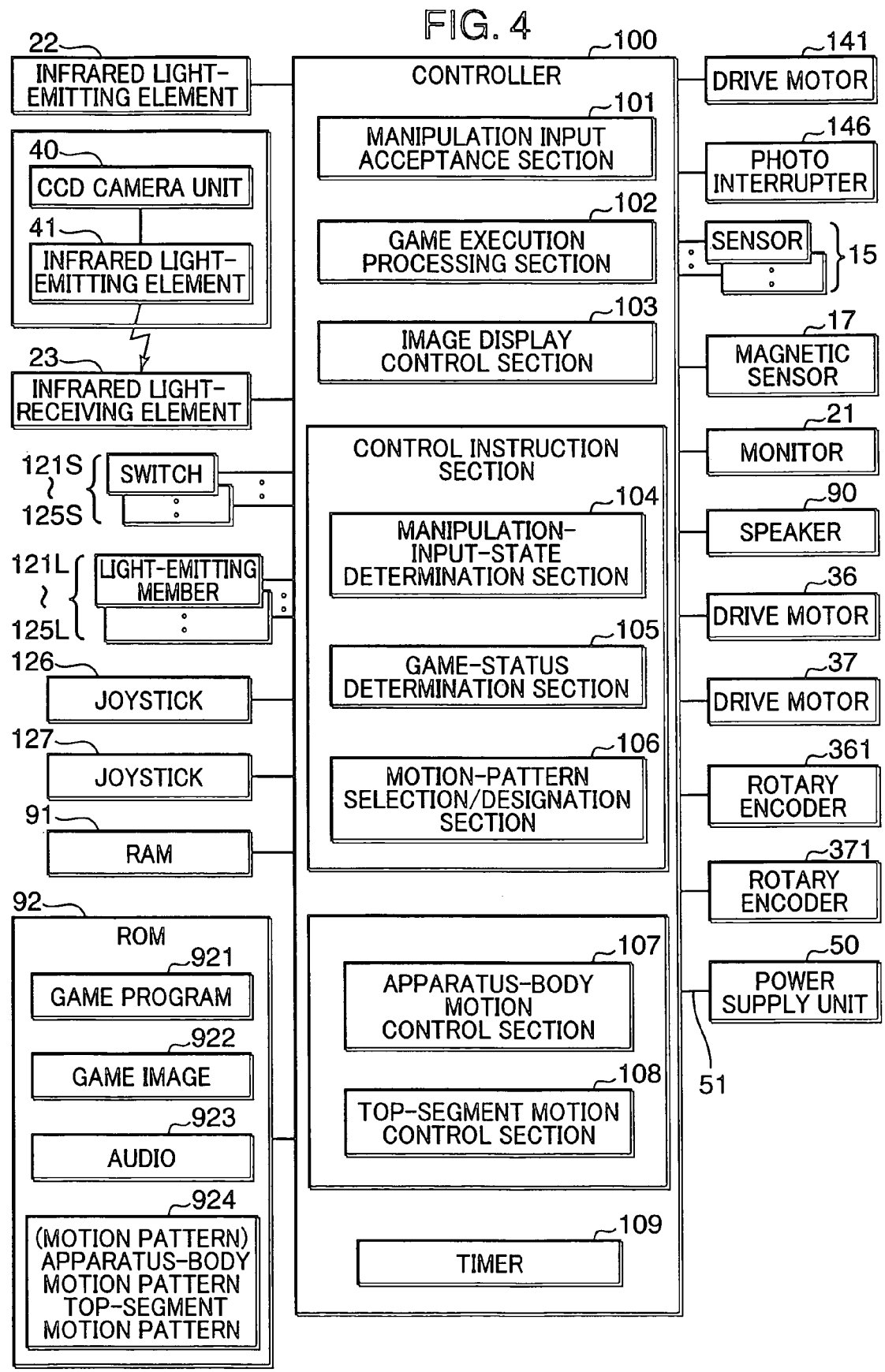
FIG. 4 is a block diagram showing one example of a circuit applicable to the above game apparatus.

FIG. 4 is a block diagram showing one example of a circuit applicable to the above game apparatus. In FIG. 4, the circuit board unit 16 is provided with a controller 100 composed, for example, of a computer, a RAM 91 for temporarily storing processed data and various count values, and a ROM 92 which stores various data. The circuit board unit 16 further includes a built-in timer 109 for measuring various times.

The ROM 92 includes a program storage section 921 which stores game program data, a game image storage section 922 which stores game image data, an audio storage section 923 which stores audio data, such as sound effects and guide sounds, to be used according to need, and a motion pattern storage section 924 which stores a motion pattern for the positional displacement, i.e., a motion pattern of the top segment 20 and a motion pattern of a base segment 10, in association with states of manipulation input by a game player, and a game progress or a game result.

A manipulation input acceptance section 101 is adapted to accept a signal from each of the switches 121S to 125S based on a whacking manipulation of each of the push buttons 121 to 125 by a game player. A game execution processing section 102 is adapted to make progress on a game according to a whacking manipulation of each of the push buttons 121 to 125 by use of a game program read from the program storage section 921. An image display control section 103 is adapted to develop game image data read from the game image storage section 922, to a display RAM according to the game program, and periodically read the game image data stored in the display RAM to display an image corresponding to a game progress, on the monitor 21. The image data storage section 922 stores character image data and guide image data each having a polygon and a texture associated with each other, and optionally background image data, in a 2-dimensional or 3-dimensional form. The image data storage section 922 further stores image data about texts and numeric characters to be used to display a score and a time. An image display section 103 comprises a drawing processor and the display RAM. When a game space is a 3-dimensional space, the drawing processor is operable to execute a coordinate calculation, such as a processing of mapping polygons of a character to the 3-dimensional space based on coordinates of a point of camera view. Then, the drawing processor is operable to convert a result of the coordinate calculation to a 2-dimensional image and sequentially write the 2-dimensional image in the display RAM.

A manipulation-input-state determination section 104 is adapted to determine a state of manipulation input of each of the push buttons 121 to 125 by a game player, for example, response to a manipulation guide, based on a time measurement result from the built-in timer 109, a frequency of manipulations and others.

A game-status determination section 105 is adapted to determine a game status, i.e., a game progress or a result after termination of a game. The determination of "game status" means a determination on a game progress (development) during game play, and the determination of "result after termination of a game" means a determination on a game result at a time when a game is terminated. Specifically, the game-status determination section 105 is operable to determine: a given state of a game progress during game play, for example a favorable development or an unfavorable development to a game player; an elapsed time from start of a game; a change in stage when the game consists of a plurality of stages; or a score corresponding to a play ability; or a combination thereof; or a remaining number of game plays when a fee for a plural number of game plays has been paid in a lump to continuously play games. Further, the determination of a game result is performed for contents of a game play, such as success or failure of the game, an obtained score, a required time in a game configured to compete on a time, a ranking in a game configured to compete on a ranking, or success or failure in clearing a given condition.

A motion-pattern selection/designation section 106 is adapted to designate a motion pattern corresponding to the determination result obtained by the game-status determination section 105, which is selected from a plurality of motion patterns stored in the motion pattern storage section 924, according to the determination result obtained by the manipulation-input-state determination section 104 and the determination result obtained by the game-status determination section 105. Thus, in this embodiment, manipulation-input-state determination means is made up of the manipulation-input-state determination section 104 and the motion-pattern selection/designation section 106, and game-status determination means is made up of the game-status determination section 105 and the motion-pattern selection/designation section 106. Further, a combination of the manipulation-input-state determination means and the game-status determination means makes up a control instruction section (equivalent to control instruction means) for generating a given drive control instruction during game play and outputting the generated drive control instruction to an after-mentioned apparatus-body motion control section 107 and top-segment motion control section 108 (these are equivalent to drive control means).

An apparatus-body motion control section 107 is adapted to output a series of time-series drive signals according to the motion pattern designated by the motion-pattern selection/designation section 106, to the drive motors 36, 37, so as to control the drive of the drive motors 36, 37 to provide a positional displacement to the base segment 10. A top-segment motion control section 108 is adapted to output a series of time-series drive signals according to the motion pattern designated by the motion-pattern selection/designation section 106, to the drive motor 141 so as to control the drive of the drive motor 141 to provide a positional displacement to the top segment 20.

In this embodiment, the pre-stored motion patterns include "forward travel action", "reverse travel action", "turnover action", "head turning action", "two-way turning action", "search action", "reluctance action" and "delight action".

The "forward travel action" is achieved by the following control. The drive motors 36, 37 are rotationally driven in a normal direction at a constant speed, for example, for a given period of time, under the control of the apparatus-body motion control section 107, to allow the base segment 10 to travel forwardly at a given speed. In a case where a given pay area is set for the game apparatus, when the base segment 10 is likely to go beyond the play area due to the forward travel, one of the drive motors is temporarily stopped or reversely rotated to change direction to allow the base segment 10 to travel forwardly in the changed direction. Whether the base segment 10 is located within the play area may be determined based on an accumulated number of rotations (i.e., distance of traveling) in the rotary encoders 361, 371, or may be determined based on a monitoring state of the CCD camera unit 40.

In the "reverse travel action", the drive motors 36, 37 are rotationally driven in a reverse direction at a constant speed, for example, for a given period of time, under the control of the apparatus-body motion control section 107, to allow the base segment 10 to travel backwardly at a given speed. A control to be performed when the base segment 10 is likely to go beyond the play area may be achieved in the same manner as that in the "forward travel action". Further, respective rotation speeds of the drive motors 36, 37 may be alternately changed only by a small value to allow the base segment 10 to travel backwardly in a staggering manner so as to realistically produce a state of struggling to get away. In this action, the base segment 10, i.e., the control panel unit 12, travels away from a game player so as to exert an influence on a difficulty level of a game.

In the "turnover action", one of the drive motors 36, 37 is rotated in the normal direction, and the other drive motor is stopped or rotated in the reverse direction, under the control of the apparatus-body motion control section 107, to change an orientation of the base segment 10. In this action, the base segment 10, i.e., the control panel unit 12, is turned to be oriented laterally relative to the front of a game player, and the screen of the monitor 21 is also turned to be oriented laterally, so as to exert an influence on the difficulty level of the game.

In the "head turning action", the drive motor 141 is rotated in either one of normal or reverse directions by a given angle, under the control of the top-segment motion control section 108, to produce a so-called head turning motion in the top segment 20. A plurality of different rotation speeds and rotation angles of the drive motor 141 may be pre-set to produce various types of motions to provide higher unpredictability. Further, in this case, the screen of the monitor 21 is turned to be oriented laterally, so as to exert a slight influence on the difficulty level of the game.

In the "two-way turning action", under the control of the apparatus-body motion control section 107, one of the drive motors 36, 37 is rotated in the normal direction, and the other drive motor is rotated at a very low speed or stopped, to turn the base segment 10 from an original position in one direction by a given angle, and then the drive motors are conversely operated to turn the base segment 10 in the opposite direction by a given angle. When the base segment 10 is turned in opposite directions by 180 degrees, the base segment 10 will be tuned rightwardly and leftwardly while traveling in rightward and leftward directions. When the drive motors 26, 37 are alternately operated in opposite rotation directions to perform the two-way turning action by less than 180 degrees, the base segment 10 can travel backwardly at a very low speed. In this action, the base segment 10, i.e., the control panel unit 12, is turned to be alternately oriented laterally rightwardly and leftwardly relative to the front of a game player, and the screen of the monitor 21 is also turned to be alternately oriented laterally rightwardly and leftwardly, so as to exert an influence on the difficulty level of the game.

In the "search action", under the control of the apparatus-body motion control section 107 and the top-segment motion control section 108, the drive motors 36, 37 and the drive motor 141 are controllably driven to orient the base segment 10 and the top segment 20 toward a game player detected by the sensor 15. The orientation of the base segment 10 is changed in the same manner as that in the "turnover action". The turnover angle may be set by using an angular difference between a current orientation of the base segment 10 and a direction of a game player detected by the sensor 15, or may be set by continuing the operation for this action until a target game player is detected at the front of the apparatus body by the sensor 15. Further, when a result of distance measurement using the sensor 15, such as an ultrasonic sensor (based on a propagation time), an optical sensor (based on distance measurement by triangulation) or a pyroelectric sensor (based on a detection level), is a given distance or more, the above drive control may additionally include the "forward travel action" at a very low speed".

In the "reluctance action", under the control of the top-segment motion control section 108, the drive motor 141 is repeatedly operated given times in such a manner that it is rotated in either one of the normal and reverse directions by a given angle, and then rotated in the opposite direction by a given angle, to produce the so-called rightward/leftward head turning motion in the top segment 20. A plurality of different rotation speeds and accumulated number of rotations of the drive motor 141 may be pre-set to produce various types of motions to provide higher unpredictability. Further, in this case, the screen of the monitor 21 is turned rightwardly and leftwardly, so as to exert a slight influence on the difficulty level of the game depending on a game type.

In the "delight action", under the control of the apparatus-body motion control section 107 and the top-segment motion control section 108, the drive motors 36, 37 are repeatedly operated given times in such a manner that one of the drive motors 36, 37 is driven in the normal direction, and the other drive motor is rotated at a very low speed or stopped, to turn the base segment 10 from an original position in one direction by a given angle, and then the drive motors are conversely operated to turn the base segment 10 in the opposite direction by a given angle. Simultaneously, the drive motor 141 is driven to turn the top segment 20 in the opposite direction by the same rotation angle as that of the base segment 10. In this action, only the base segment 10 can be turned while orienting the top segment 20 frontwardly (keeping the top segment 20 stationary).

Among the above actions, the action capable of exerting an influence on the difficulty level of the game may be designed to be performed at a timing having no direct relation with the difficulty level of the game. For example, the game apparatus may be designed such that, when a game player obtains an excellent score as a game result after termination of a game, the "two-way tuning action" is performed as if it expresses human's amazement.

Figure 5:
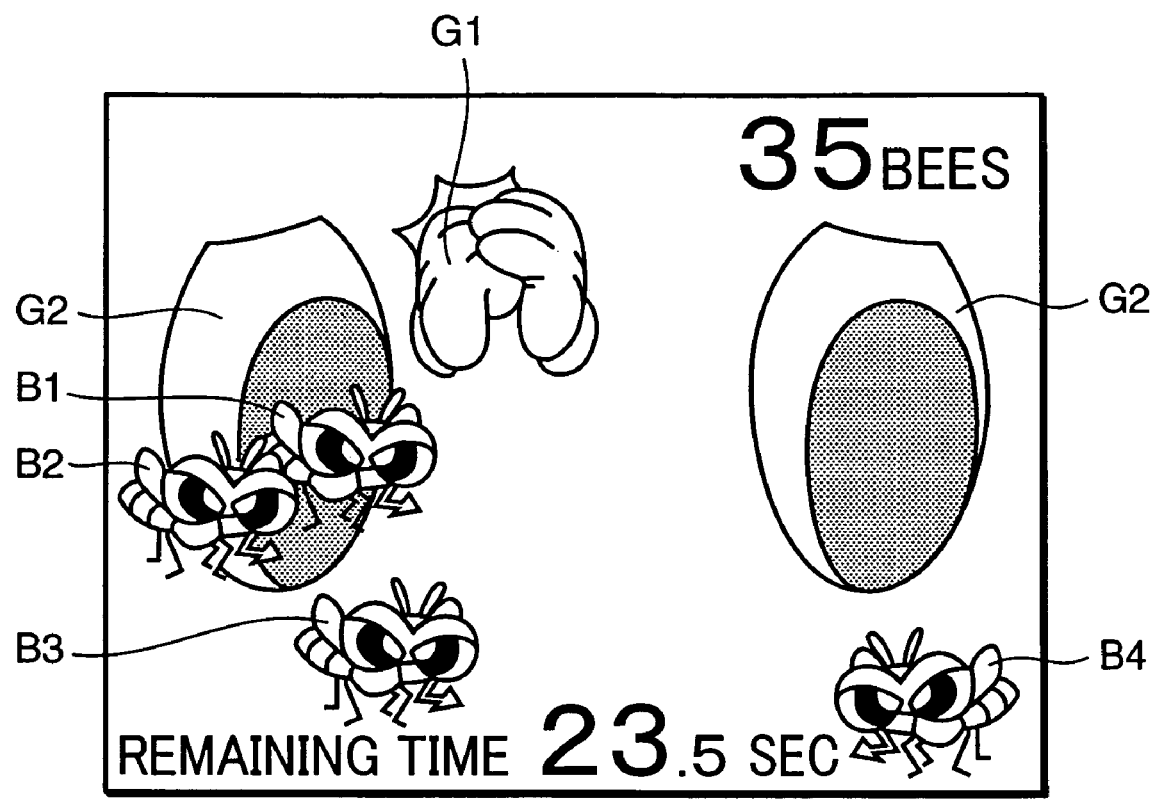
FIG. 5 is a diagram showing one example of a screen image during play of a first game to be executed by the game apparatus.
Figure 6:
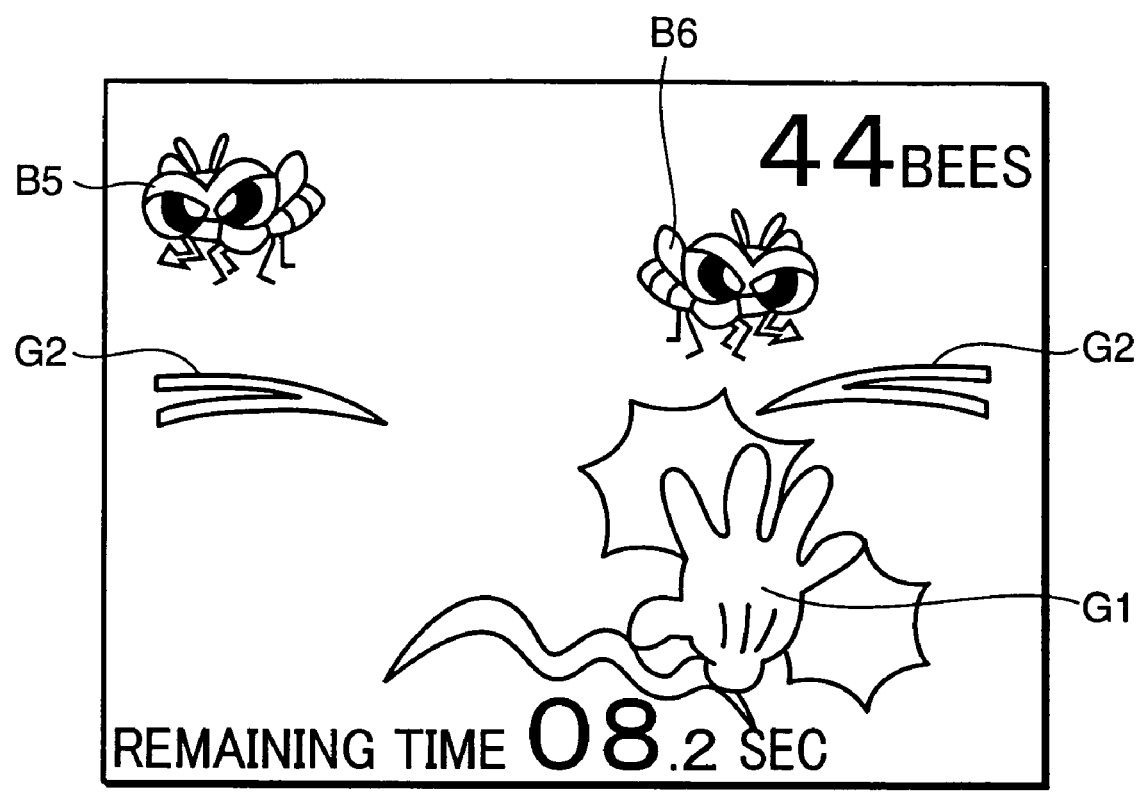
FIG. 6 is a diagram showing another example of the screen image during play of the first game to be executed by the game apparatus.
Figure 7:
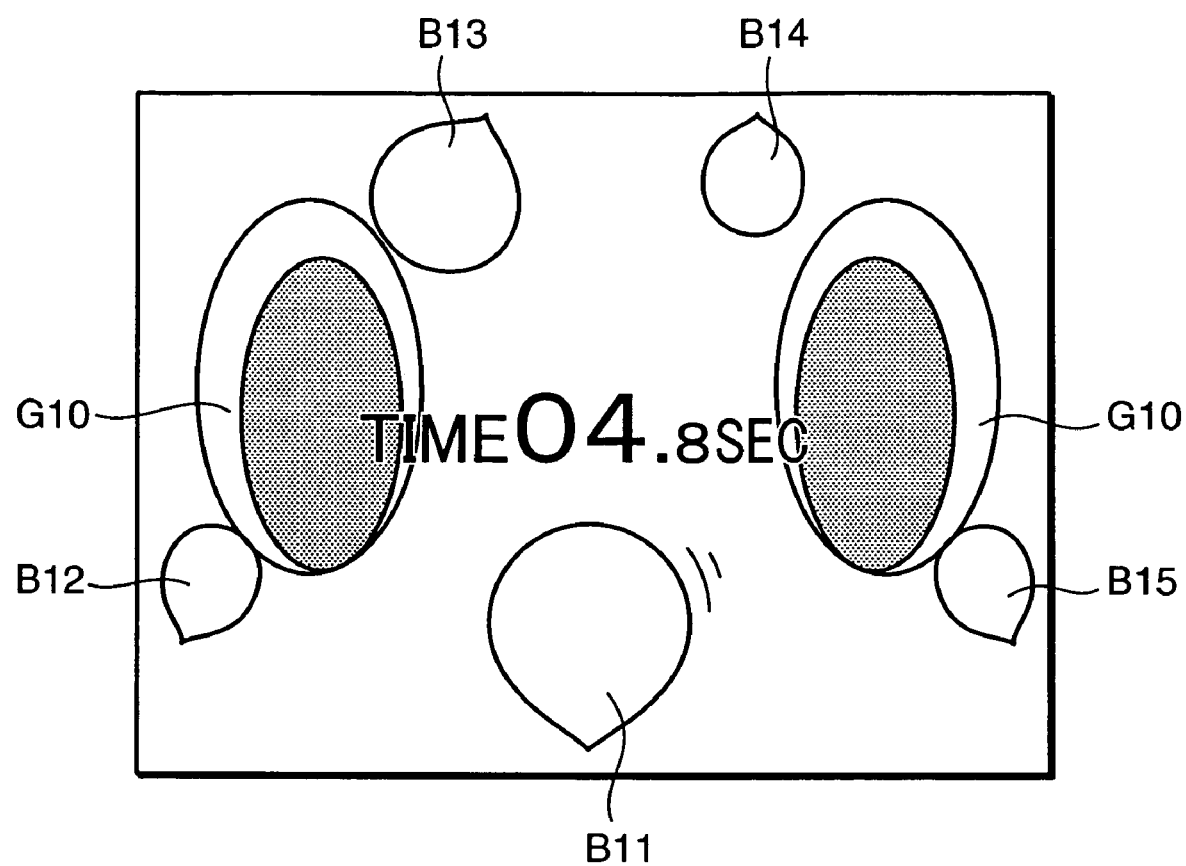
FIG. 7 is a diagram showing one example of a screen image during play of a second game to be executed by the game apparatus.
Figure 8:
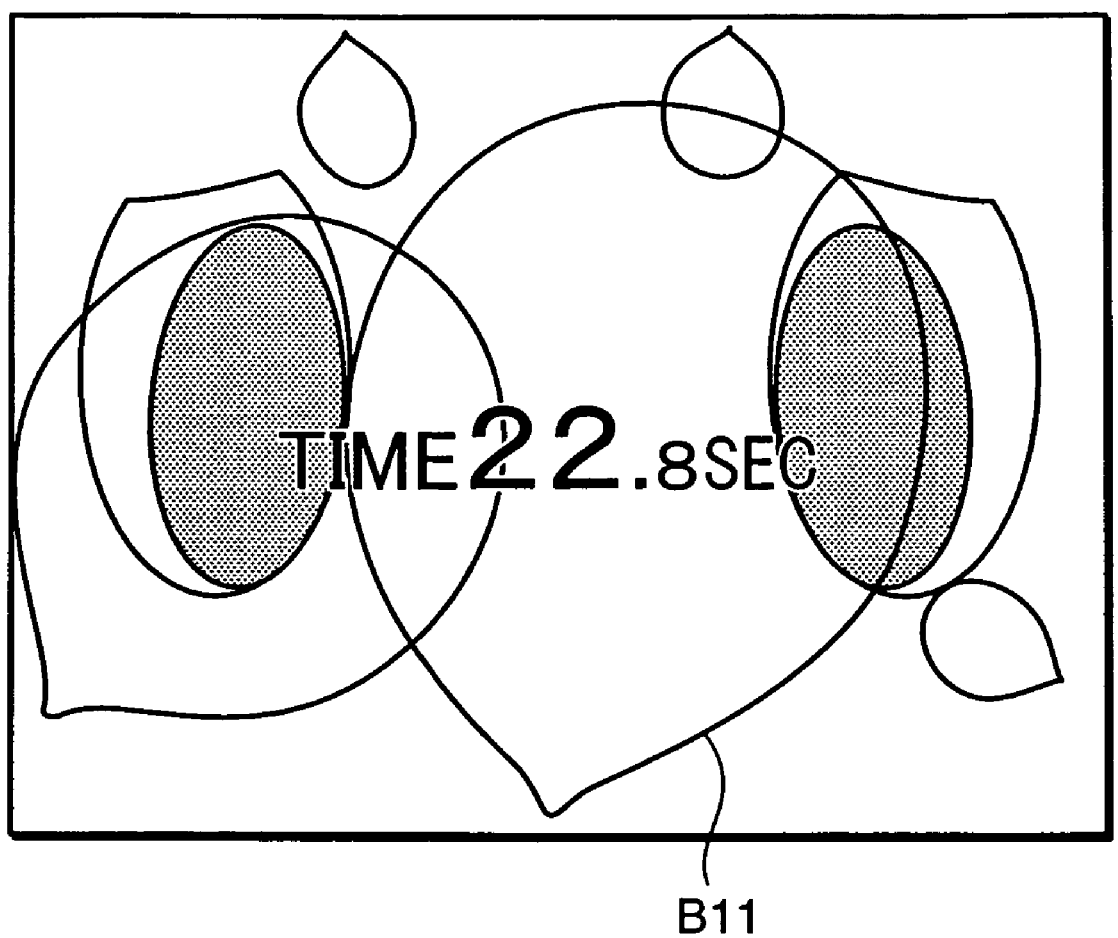
FIG. 8 is a diagram showing another example of the screen image during play of the second game to be executed by the game apparatus.
Figure 9:
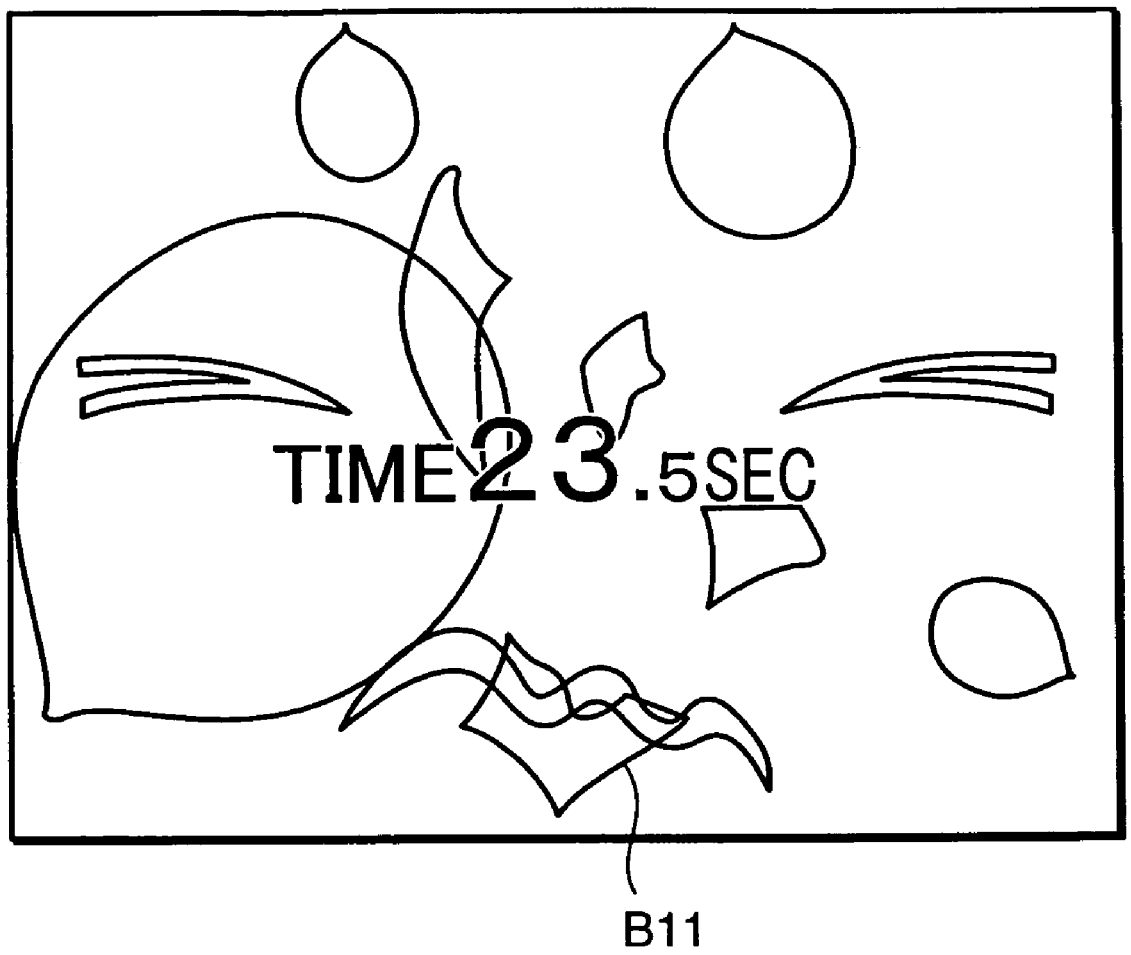
FIG. 9 is a diagram showing yet another example of the screen image during play of the second game to be executed by the game apparatus.

FIGS. 5 and 6 show an example of a screen image of the monitor 21 during play of a first game to be executed by the game apparatus. FIGS. 7 to 9 show an example of a screen image during play of a second game to be executed by the game apparatus. In FIG. 5, on the screen, a plurality (in this example, four) of target characters B1 to B4 simulating red, blue and yellow insects (in this example, bees) are displayed in such a manner that they fly around, and a gloved hands character G1 and an eyes character G2 are displayed. The target characters B1, B2 are red, and the target character B3 and the target character B4 are blue and yellow, respectively.

Further, the number of target characters which have been slapped down is displayed at an appropriate position, for example in an upper left corner, of the screen, for example in the form of "35 bees", and a remaining time counted by the built-in timer 109 is displayed in a lower region of the screen.

The first game is a sort of so-called "whack-a-mole game", which is configured to allow the target characters B displayed on the screen to be slapped down one-by-one by whacking (pushing) a push button having the same color as that of each of the target characters, and compete on a total number of target characters which could be slapped down within a time limit. When the push button having the same color as that of the displayed target character is whacked, an image presenting that the hands character G1 slaps an insect is displayed as an adequate manipulation input. If a push button having a wrong color is whacked, an image presenting that the hands character G1 slaps its head and the eyes character G2 closes eyes as shown in FIG. 6 is displayed as an erroneous manipulation. In FIG. 6, two bees of the red target character B5 and the blue target character B6 which have increased during game play remain on the screen. The number of slapped bees, and the remaining time, are displayed as "44 bees" and "Remaining Time 08.2 sec, respectively.

In a screen image of the second game illustrated in FIG. 7, a plurality of balloon characters B11 to B15 simulating red, blue and white balloons are displayed, and an eyes character G10 simulating both eyes is displayed. The balloon character B11 is yellow, and the balloon character B12 is blue. The balloon characters B13, B14 are white, and the balloon character B15 is red. A time counted by the built-in timer as an elapsed time from start of the game is displayed as "Time 04.8 sec".

The second game is a sort of so-called "continuous hitting game", which is configured to allow air to be supplied into the balloon character B displayed on the screen by whacking a push button having the same color as that of the balloon character, and allow the balloon character B to be finally burst by further repeatedly whacking the push button. In this embodiment, the second game is configured to be terminated when all of the balloon characters on the screen are burst, and compete a lapsed time reaching to the termination. FIG. 8 shows a state when the yellow balloon character B11 is being expanded, wherein "Time 22.8 sec" is displayed as the elapsed time. In FIG. 9, an image is displayed such that the yellow balloon character B11 is burst and the eyes character G10 is changed to close both eyes. That is, the screen displays that "Time 23.5 sec" has been taken to burst the first balloon character B11.

Figure 10:
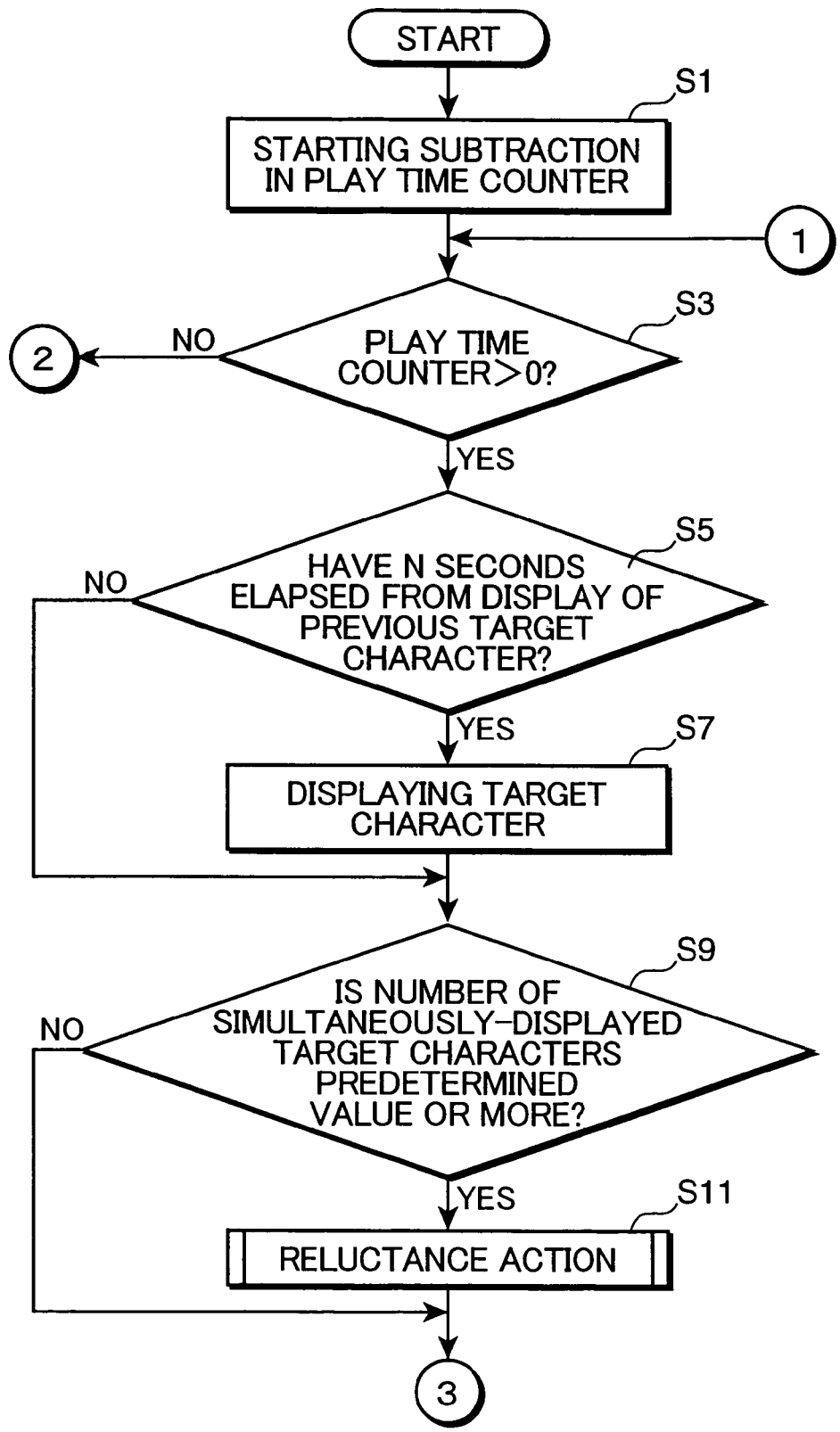
FIG. 10 is a flowchart showing one example of a processing of the first game to be executed by a controller.
Figure 11:
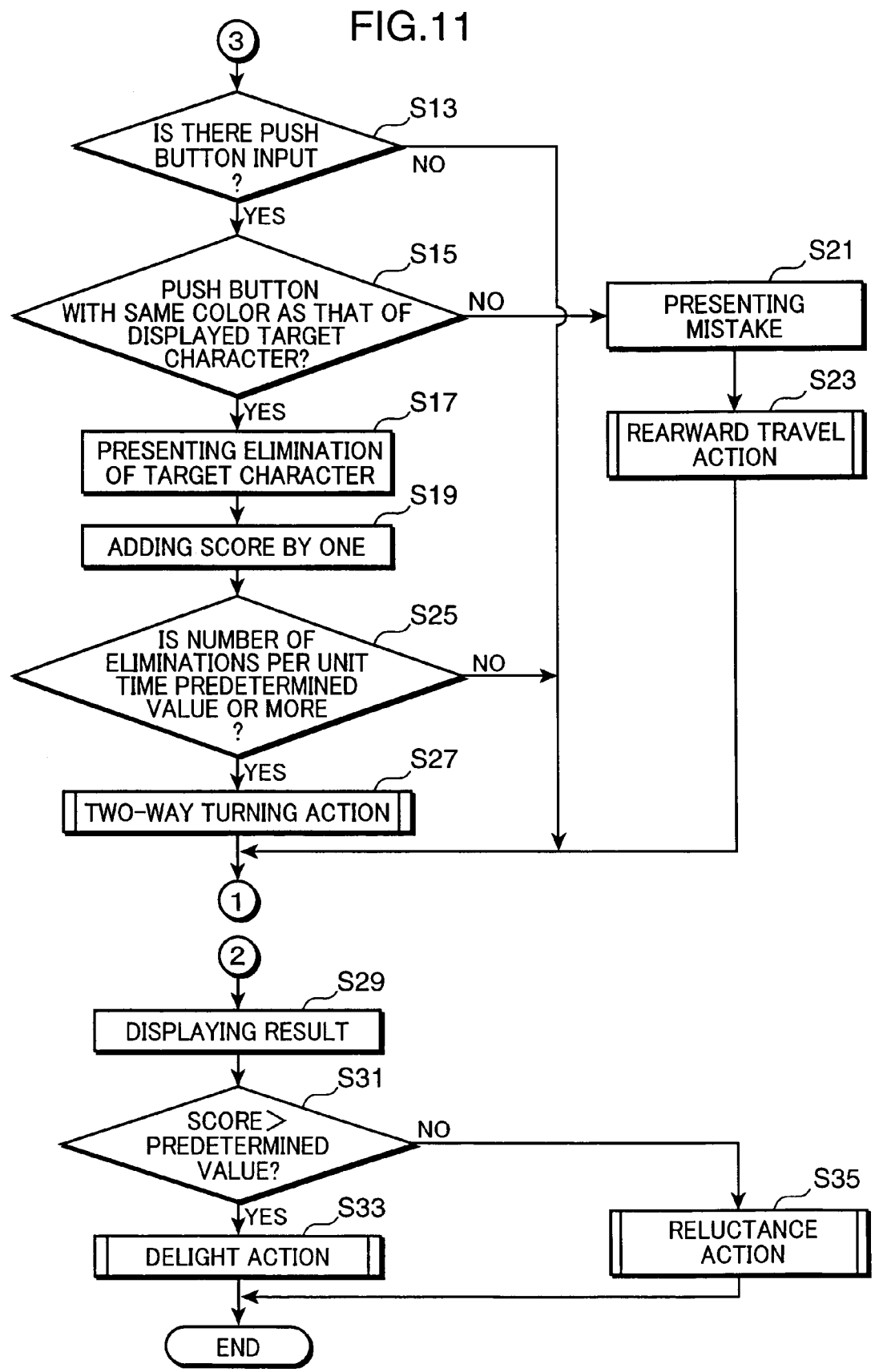
FIG. 11 is a flowchart showing one example of a processing of the first game to be executed by the controller.

FIGS. 10 and 11 show a flowchart showing one example of a processing of the first game to be executed by the controller 100. Firstly, after a time limit is set to a play time counter, a subtraction processing by one second is started (Step S1), and it is determined whether the play time counter has a positive value (Step S3). If the value is not positive, it is determined that the time limit is terminated, and the process advances to Step S29. When the value is positive, it is determined that the game is in progress, and then it is determined whether n seconds, i.e., a given time from a display of a previous target character, have elapsed (Step S5). When the n seconds have elapsed, a new target character is displayed (Step S7), i.e., one target character is added. If the n seconds have not elapsed, Step S7 will be skipped.

Then, the game-status determination section 105 determines whether the number of target characters which are being simultaneously displayed is a predetermined value or more (Step S9). When the number is the predetermined value or more, the motion-pattern selection/designation section 106 designates the "reluctance action" to represent that the number of target characters excessively increases (Step S11). Conversely, if the number does not reach the predetermined value, Step S11 will be skipped.

Then, the manipulation-input-state determination section 104 determines whether there is a manipulation input to the push buttons (Step S13). If there is the manipulation input, the manipulation-input-state determination section 104 further determines whether a push button having the same color as that of the displayed target character is manipulated (whacked) (Step S15). When a push button having the same color as that of the displayed target character is manipulated, the image display control section 103 operates to display an image representing an elimination of the target character (Step S17). For example, an image presenting that the target character falls in a downward direction of the screen and finally disappears from the screen may be employed. Then, a score is added by one (Step S19), and the process advances to Step S25.

In Step S15, if the manipulation-input-state determination section 104 determines that a push button having a different color from that of the displayed target character is manipulated, the image display control section 103 operates to display an image presenting a mistake as shown in FIG. 6 (Step S21). Further, the motion-pattern selection/designation section 106 designates the "reverse travel action" (Step S23) to allow the base segment 10 to travel backwardly (escapingly run around) so as to increase the difficulty level of the game.

In Step S25, the game-status determination section 105 determines whether the number of eliminations per unit time is a predetermined value or more (Step S25). When the number is the predetermined value or more, the motion-pattern selection/designation section 106 designates the "two-way turning action" (Step S27), and then the process returns to Step S3. The base segment 10 is turned rightwardly and leftwardly according to the "two-way turning action" so as to increase the difficulty level of the game. If the number does not reach the predetermined value, the process directly returns to Step S3.

Then, in Step S3, when the play time counter does not have a positive value, it is determined that the time limit has passed, and a processing of terminating the game is performed (Step S29) to display a game result. Then, the game-status determination section 105 determines whether an accumulated score in Step S19 is a predetermined value or more (Step S31). When the accumulated score is the predetermined value or more, the motion-pattern selection/designation section 106 designates the "delight action" to turn only the base segment 10 rightwardly and leftwardly while keeping the top segment 20 stationary. Conversely, if the accumulated score does not reach the predetermined value, the motion-pattern selection/ designation section 106 designates the "reluctance action" to turn the top segment 20 rightwardly and leftwardly.

As above, in the first game, as described, for example, in Step S11, when the number of simultaneously-displayed target characters is the predetermined value or more, i.e., a game player cannot adequately slaps the target character, the robot performs the "reluctance action" as if it senses that fact, and reveals disgusting feeling of or mocks. Further, as described, for example, in Step S27, when the number of eliminations per unit time is the predetermined value or more, i.e., a game player can excellently play the game, the robot performs "two-way turning action" as if it is surprised. In this manner, the game apparatus according to this embodiment can perform various motions depending on the game player's manipulation state of a game player to give unexpected surprise to the game player and accelerate the drive for challenging.

Figure 12:
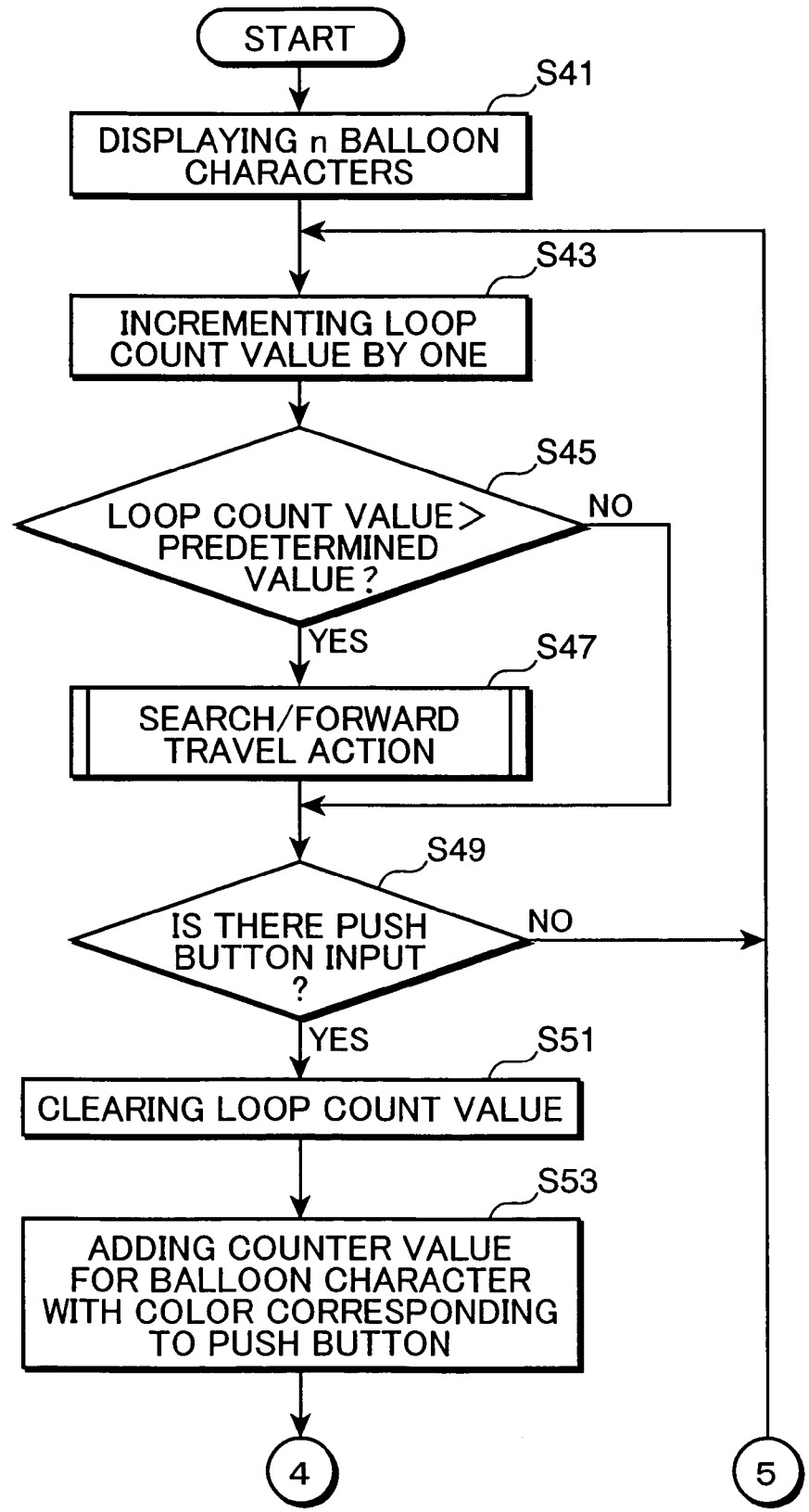
FIG. 12 is a flowchart showing one example of a processing of the second game to be executed by the controller.
Figure 13:
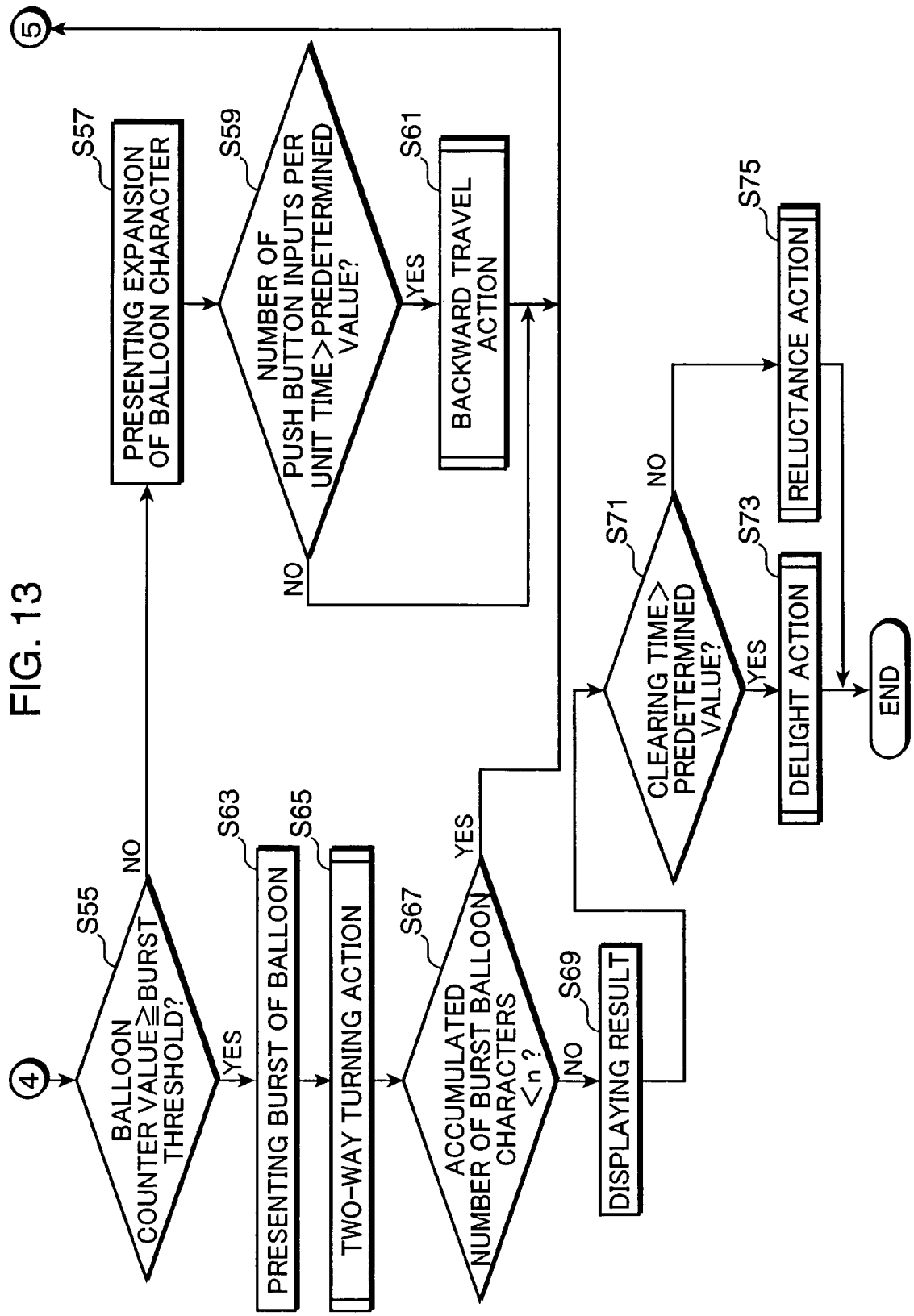
FIG. 13 is a flowchart showing one example of a processing of the second game to be executed by the controller.

FIGS. 12 and 13 are flowcharts showing an example of a processing of the second game to be executed by the controller 110. Firstly, a given number n of balloon characters are displayed on the screen of the monitor 21 (Step S41). Then, a loop count value is incremented by one (Step S43), and then the manipulation-input-state determination section 104 determines the loop count value exceeds a predetermined value (Step S45). When the loop count value exceeds the predetermined value, the motion-pattern selection/designation section 106 designates the "search/forward travel action" (Step S47) to allow the base segment 10 and the top segment 20 to be oriented toward a game player and travel in this direction at a very low speed. That is, when there is no manipulation input from the game player to the push buttons for a given period of time despite of the display of the balloon characters, the entire game apparatus, i.e., the control panel unit 12 and the monitor 21, is oriented toward the game player and moved closer to the game player to facilitate an input manipulation. If the loop count value is equal to or less than the predetermined value, the Step S47 will be skipped.

Then, it is determined whether there is a manipulation input to the push buttons (Step S49). If there is no manipulation input to the push buttons, the process will return to Step S43, and the loop count value will be incremented by one. When there is the manipulation input to the push button, the loop count value is reset to zero (Step S51), and a balloon count value for the balloon character having a color corresponding to the pushed push button is incremented by one (Step S53).

Then, the game-status determination section 105 determines whether the balloon counter value reaches a burst threshold (Step S55). When the balloon counter value does not reach a burst threshold, an image presenting a given level of expansion of the balloon is displayed (Step S57). Then, the manipulation-input-state determination section 104 determines whether the number of manipulation inputs per unit time to the push button exceeds a predetermined value (Step S59). When the number of manipulation inputs per unit time to the push button exceeds the predetermined value, the motion-pattern selection/designation section 106 selects the "backward travel action" (Step S61) to allow the base segment 10 to travel backwardly. This backward traveling is intended to make the manipulation of the push button difficult for a game player by providing a motion of escapingly running away backwardly to the base segment 10, i.e., the control panel unit 12. If the number of manipulation inputs per unit time to the push button does not exceed the predetermined value, the step S61 will be skipped.

In Step S55, when it is determined that the balloon counter value reaches the burst threshold, an image presenting that the balloon character is burst as shown in FIG. 9 is displayed (Step S63), and the motion-pattern selection/designation section 106 selects the "two-way turning action" (Step S65) to turn the base segment 10 rightwardly and leftwardly, optionally with a forward travel at a very low speed. Thus, the base segment 10 takes behavior to express a surprise for the burst of the balloon.

Then, the game-status determination section 105 determines whether an accumulated number of burst balloon characters reaches "n" (Step S67). If not, some of the remaining balloon characters remain, and therefore the process will return to Step S43. When the accumulated number of burst balloon characters reaches "n", it is determined that the game is terminated, and a processing of displaying a game result is performed (Step S69). For example, an elapsed time taken to clear the game is displayed.

Then, it is determined whether the clearing time exceeds a predetermined value (Step S71). When the clearing time exceeds the predetermined value, the motion-pattern selection/designation section 106 designates the "delight action" (Step S73), to turn only the base segment 10 rightwardly and leftwardly while keeping the top segment 20 stationary. Conversely, if the clearing time exceeds the predetermined value, the motion-pattern selection/designation section 106 designates the "reluctance action" (Step S75) to turn the top segment 20 rightwardly and leftwardly.

As above, in the second game, for example, as in Step S47, when the loop count value is greater than the predetermined value, i.e., there is no game player's manipulation input, the robot performs the "search/forward travel action" for allowing the robot to come closer to the game player, to facilitate input manipulation by the game player. That is, the state of manipulation input of the game player is determined to be "inexperience", and the difficulty level of the game is lowered based on this determination to facilitate inputting.

Further, for example, in Step S61, when the number of push button inputs per unit time is greater than the predetermined value, i.e., a game player has excellent skill in input manipulation, the robot performs "backward travel action" for getting away from the game player. That is, in this case, it is determined that the manipulation input of the game player is "excellent", and "the game should has higher difficulty level", and the difficulty level of the game is increased based on the determination to make inputting difficult. Thus, the player is required to perform an input manipulation while following the robot which is displacing in a direction away from the game player, and therefore can play a highly enjoyable game having not only higher difficulty level of inputting but also a requirement of performing the game while largely moving his/her body to follow the displacing robot, which has not exist in conventional arcade game machines. In this embodiment, the "backward travel action" is used to make inputting difficult. Alternatively, for example, the "turnover action" may be performed to make inputting difficult.

As described above, the game apparatus according to this embodiment is designed to turn and displace a housing itself with the control panel unit 12 so as to change a difficulty level of a game based on a motion of the housing depending on a state of manipulation input by a game player. This makes it possible to achieve a game having a difficulty level and variation which are totally different from those in inputting to a manipulation unit of a fixed housing as in conventional arcade game machines.

The following aspects may also be employed in the present invention.

(1) In place of the monitor, an audio-output speaker having a given directionality may be employed as the manipulation guide unit. Such a speaker can also guide a manipulation input.

(2) While the above embodiment is designed to integrate the control panel unit 12 with the base segment 10, the present invention is not limited to this structure. For example, a component including the push buttons of the control panel unit 12 may be separated from the apparatus body, and provided with the movement mechanism unit to provide a movable manipulation unit which serves as the manipulation input unit and has a motion for positional displacement, i.e., a turning motion, a traveling motion within a game area, or a combination of the two motions.

(2-1) For example, the apparatus body provided with the controller and communication means may be placed upright at an appropriate position facing a game area. Further, a plurality of the above movable manipulation units adapted to be drivingly controlled wiredly or wirelessly from the communication means of the apparatus body, or a plurality of movable manipulation units each having a certain built-in drive control unit capable of independent control, a traveling mechanism and a communication unit, may be designed to be positionally displaced in an mutually associated manner or independently, preferably in such a manner as to travel around. This movable manipulation unit corresponds to one of the push buttons in the above embodiment, and may be a model simulation a small animal or a miniature version of an anthropomorphic model. In this case, a signal representing a whacking of a whacking push button provided at an appropriate position of each surface of the movable manipulation units may be detected by a built-in switch, and the detected signal may be transmitted to the controller of the apparatus body so as to allow a given game (e.g., the games in the above embodiment) to be executed.

(2-2) As another embodiment, the apparatus body provided with the controller and communication means may partially have a game table member formed to have a top surface serving as a game area, and a given thickness, and the motion for positional displacement may be given to the above movable manipulation units in (2-1), on the top surface of the game table member.

(3) In the above embodiment, the plurality of different motion patterns for the positional displacement are set for each of a determination result on a manipulation input state, a determination result on a game progress or a determination result on a game result. Alternatively, either one of the actions may be used for each of the determination results to achieve the present invention.

(4) In the above embodiment, the orientation of the game apparatus is detected by the magnetic sensor 17. Alternatively, a plurality of position-detecting light-emitting elements may be disposed at appropriate positions (e.g., two infrared light-emitting elements is arranged in a top end of the monitor 21 along a frontward/rearward direction or a rightward/leftward direction), and each of the infrared light-emitting elements may be designed to have a different lighting pattern, such as a different blinking cycle. In this case, the CCD camera unit 40 can identify the two infrared light-emitting elements, and a picked-up image can be subjected to a processing to detect an orientation of the top segment 20. Further, based on information about an angular difference between the top segment 20 and the base segment 10 obtained from the processing, an orientation of the base segment 10 can be detected. Alternatively, a plurality of position-detecting light-emitting elements may be disposed on the side of the base segment 10. In this case, the information about an angular difference between the top segment 20 and the base segment 10 to be obtained from the above processing becomes unnecessary, and therefore the processing can be simplified.

(5) In the above embodiment, a position of the game apparatus is detected using the infrared light-emitting element 22, the infrared light-receiving element 23, the CCD camera unit 40 and the infrared light-emitting element 41. Alternatively, for example, a game area is provided, and a given pattern (graphic pattern) may be drawn on a floor of the game area. Further, a reader device may be disposed on the lower or bottom surface of the base segment 10, preferably at a central position of the bottom surface to optically read the pattern of the floor so as to recognize a position. The given pattern is not limited to the drawn pattern, but may be an electrical or magnetic pattern. In this case, the reader device may be an electrostatic sensor or a magnetic sensor.

(6) In the above embodiment, the power supply unit 50 is connected to the game apparatus via the power feed cable 51 to supply power to the game apparatus. Alternatively, a built-in battery or rechargeable secondary battery may be employed, and replaced or recharged depending on a remaining capacity. This eliminates the need for the power feed cable 51 so as to provide enhanced flexibility in a motion for positional displacement of the game apparatus and give an impression as an independent game apparatus to a game player.

(7) The above embodiment has been described based on an example where the present invention is applied to a so-called continuous hitting game and whack-a-mole game (while the whacking in this embodiment is performed by a hand, a specific whacking member may be used therefor). Another applicable game may include a game simulating the sumo wrestling. Specifically, a robot corresponding to a sumo wrestler may be designed to be moved backwardly as a push button is whacked at higher frequency by a game player, and conversely moved closer to the game player as the push button is whacked at lower frequency by the game player. Further, the applicable game is not limited to the whacking-based game, but the present invention may be applied to a game configured to have a progress according to a directional instruction given by a tilting manipulation of a control lever, such as a joystick (e.g., hand flag game; in this case, the game apparatus is designed to generate an audio or voice instructing a selection of either one of right/left flags or red/while flags, and a game player manipulates either one of two control levers which corresponds the generated instruction), a game configured to have a progress according to a given rotational manipulation of a control member, or a game configured to compete on coincidence between respective timings of a guidance and a manipulation input.

(8) The manipulation input unit is not limited to a switch (sensor), such as a push button adapted to perform a detection based on a direct contact therewith, but may comprise a light-emitting element adapted to emit a light beam, and a light-receiving element disposed in opposed and spaced-apart relation to the light-emitting element and adapted to receive the light beam. In this case, the manipulation input unit may be designed to detect a blocking of the light beam due to an object interposed in a space between the light-emitting and light-receiving elements, such as a part of game player's body passing through the space, so as to allow the player to perform a so-called remote manipulation input.

(9) In this embodiment, the anthropomorphic game apparatus has been employed. The present invention is not limited to such a configuration, but may have a configuration simulating an animal. Further, instead of the combination of the base segment 10 and the top segment 20, the game apparatus of the present invention may consist of only the base segment 10, or may comprise a hands segment simulating both hands of a human, in place of or in addition to the top segment 20. In this case, the hands segment may be designed to have a given motion associated with the action of the base segment 10.

As above, the game apparatus of the present invention comprises a manipulation input unit for accepting an external manipulation to make progress on a game, a manipulation guide unit for providing a guidance of prompting a manipulation input to the manipulation input unit, a movement mechanism unit for providing a positional displacement to the manipulation input unit, drive control means for controlling the drive of the movement mechanism unit, and control instruction means for generating a given drive control instruction during game play and outputting the generated drive control instruction to the drive control means.

In the above game apparatus, a game player performs a manipulation to the manipulation input unit (plays a game) while looking at a guidance of the manipulation guidance unit, to make progress on a game. Then, the control instruction means determines a given status during game play, and issues an instruction for a positional displacement of the manipulation input unit according to the determination result at that time or moment to moment. The positional displacement of the manipulation input unit can create a change in difficult level of the manipulation input by the game player so as to enhance game player's enjoyment.

Preferably, the control instruction means comprises manipulation-input-state determination means for determining a state of manipulation to the manipulation input unit, and outputting a drive control instruction corresponding to a result of the determination result, to the drive control means. In this game apparatus, a game player performs a manipulation to the manipulation input unit (plays a game) while looking at a guidance of the manipulation guide unit, to make progress on a game. Then, the manipulation-input-state determination means determines a state of manipulation accepted through the manipulation input unit, i.e., a state of manipulation input by the game player, and issues an instruction for a positional displacement of the manipulation input unit according to the determination result at that time or moment to moment. The positional displacement of the manipulation input unit can create a change in difficult level of the manipulation input by the game player so as to enhance game player's enjoyment.

In the above game apparatus, the motion for positional displacement may include either one of a plurality of motions consisting of a turning motion causing a change in orientation of the manipulation input unit and a traveling motion (at least one of forward/backward, rightward/leftward and diagonal motions) causing a locational change, and a complicate motion consisting of a simultaneous motion of turning and traveling. In an embodiment where the movement mechanism unit employs a telescopic mechanism for achieving an upward/downward motion, the motion for positional displacement may further include an upward/downward motion. The state of manipulation input may include a state in which no manipulation input is performed by a game player, and a certain drive (e.g., an operation for prompting a game player to input) may be executed in response to no manipulation input.

Preferably, the manipulation-input-state determination means is adapted to pre-store a plurality of motion patterns for the positional displacement, and, after selecting a given motion pattern from the plurality of motion patterns based on the determination result on the state of manipulation input to the manipulation input unit, output the selected motion pattern to the drive control means as the drive control instruction. In this game apparatus, the state of manipulation input to the manipulation input unit by a game player, e.g., the frequency of the manipulation input, such as "high frequency" or "low frequency", is determined. Then, one of the plurality of pre-stored motion patterns is designated based on the determination result to change the motion for positional displacement so as to enhance game player's enjoyment.

Preferably, the movement mechanism unit is operable to provide at least either one of a turning motion and a traveling motion on a single plane, to the manipulation input unit as a motion for positional displacement. In this game apparatus, the manipulation input unit can turn or travel on a single plane, e.g., a horizontal plane, to get closer or away from a game player so as to exert an influence on a difficulty level of the manipulation thereof. Particularly, the turning and traveling motions may be simultaneously performed to provide a further complicated motion.

Preferably, the above game apparatus includes a base segment having the manipulation input unit, and the movement mechanism unit is provided in the base segment. In this game apparatus, the movement mechanism unit is operable to allow the base segment to have a motion for positional displacement so as to achieve a motion for positional displacement to the manipulation input unit. That is, the movement mechanism unit is provided directly in a housing, for example, of an amusement machine, and therefore the housing itself performs an approaching motion, a spacing motion or another motion relative to a game player. This makes it possible to give to the game player a feeling such that he/she plays a game with a robot or an artificial creature one-on-one, so as to provide further enhanced unpredictability and amusingness to the game player.

Preferably, the movement mechanism unit includes a plurality of rotatable members which are attached to a bottom surface of the base segment, and a drive source for rotationally moving at least one of the rotatable members. In this game apparatus, the base segment can be positionally displaced according to a rotation of the plurality of rotatable members attached to the bottom surface thereof, and at least one of the rotatable members is rotationally driven to provide a turning motion and/or a traveling motion to the apparatus body. Further, the turning and traveling motions may be simultaneously performed to achieve a further complicated motion.

Preferably, the above game apparatus includes a top segment disposed in an upper portion of the base segment and turnably supported relative to the base segment, and the manipulation-input-state determination means is operable, when the state of manipulation input has a given state, to give a turning instruction to the top segment. In this game apparatus, for example, given that the base segment and the top segment are, respectively, is a torso and a head of a human, a game apparatus having an anthropomorphic model or a model with an appearance of a creature, such as an animal, can be provided. When the state of manipulation input to the manipulation input section by a player has a given state, the top segment is turned relative to the base segment to provide further enhanced unpredictability. In addition, the turning of the top segment causes deterioration in visibility of the content of the guidance from the manipulation guide unit to exert an influence on a difficulty level of a game play so as to further enhance game player's enjoyment.

Preferably, the top segment is adapted to turn about an approximately vertical axis. In this game apparatus, only the top segment can be turned rightwardly and leftwardly to achieve a motion of wagging a head. Further, the base segment and the top segment may be turned with a relative speed difference to achieve a further complicated motion. For example, the base segment and the top segment may be turned at the same speed in opposite directions, so that only the base segment can be turned while keeping the top segment stationary. Further, the base segment and the top segment may be turned in the same directions, so that the top segment can be turned at a high speed as compared with a case where only the top segment is turned.

Preferably, the above game apparatus includes detection means for detecting a game player around a body of the apparatus, and the manipulation-input-state determination means is operable to output the drive control instruction to the drive control means according to a detected direction and the state of manipulation input. In this game apparatus, an approaching motion or a spacing motion can be achieved in response to detecting of a game player.

Preferably, the control instruction means comprises game-status determination means for determining a game status, and outputting a drive control instruction corresponding to a result of the determination, to the drive control means. In this game apparatus, a game player performs a manipulation to the manipulation input unit (plays a game) while looking at a guidance of the manipulation guide unit, to make progress on a game. Then, the game-status determination means determines a status of the game according to the manipulation input by the game player, and issues an instruction for a positional displacement of the manipulation input unit according to the determination result at that time or moment to moment. The manipulation input unit is positionally displaced according to the game status, and thereby the difficult level of the manipulation input by the game player is changed to exert an influence on a subsequent game status so as to enhance game player's enjoyment.

In the above game apparatus, the motion for positional displacement may include either one of a plurality of motions consisting of a turning motion causing a change in orientation of the manipulation input unit and a traveling motion (at least one of forward/backward, rightward/leftward and diagonal motions) causing a locational change, and a complicate motion consisting of a simultaneous motion of turning and traveling. In an embodiment where the movement mechanism unit employs a telescopic mechanism for achieving an upward/downward motion, the motion for positional displacement may further include an upward/downward motion.

The game status means at least either one of a game status during game play and a game status at a time when a game is terminated. In case of the game status during game play, the manipulation input unit is positionally displaced during game play in response to a given condition of a game progress, such as a favorable development or an unfavorable development to a game player; an elapsed time from start of a game; a change in stage when the game consists of a plurality of stages; or a score corresponding to a play ability; or a combination thereof; or a remaining number of game plays when a fee for a plural number of game plays has been paid in a lump to continuously play games. Thus, in addition to a change in difficulty level of a game, an unpredictable motion to a game player can be performed to provide a game with a higher level of game-enjoyment. In case of the game status at a time when a game is terminated, the manipulation input unit is positionally displaced, for example, in response to success or failure of the game, an obtained score, a required time in a game configured to compete on a time, or success or failure in clearing a given condition. This makes it possible to provide a game with enhanced unpredictability and amusingness in line with a game result.

Preferably, the game-status determination means is adapted to pre-store a plurality of motion patterns corresponding to the game status, and, after selecting a given motion pattern from the plurality of motion patterns based on the determination result on the game status, output the selected motion pattern to the drive control means as the drive control instruction. In this game apparatus, the motion pattern of the manipulation input unit is designated for each of a plurality of game statuses, such as a favorable development or an unfavorable development to a game player, a change in game stage during game play, an occurrence of a random event and various other statues, to change the motion for the positional displacement so as to enhance game player's enjoyment.

Preferably, the above game apparatus includes a top segment disposed in an upper portion of the base segment and turnably supported relative to the base segment, and the game-status determination means is operable, when the game status has a given state, to give a turning instruction to the top segment. In this game apparatus, for example, given that the base segment and the top segment are, respectively, is a torso and a head of a human, a game apparatus having an anthropomorphic model or a model with an appearance of a creature, such as an animal, can be provided. When the game status has a given state, the top segment is turned relative to the base segment to provide further enhanced unpredictability. In addition, the turning of the top segment causes deterioration in visibility of the content of the guidance from the manipulation guide unit to exert an influence on a difficulty level of a game play so as to further enhance game player's enjoyment.

While this specification includes the description about means for achieving a certain function, such a means is not limited to a specific component or element described in the specification to achieve the function, but may include any other suitable component or element, such as a unit or a mechanism, capable of achieving the function.

INDUSTRIAL APPLICABILITY

According to the game apparatus of the present invention, a game player can perform a manipulation to the manipulation input unit (can play a game) while looking at a guidance of the manipulation guidance unit, to make progress on a game. Then, the control instruction means determines a given status during game play, and issues an instruction for a positional displacement of the manipulation input unit according to the determination result at that time or moment to moment. The positional displacement of the manipulation input unit can create a change in difficult level of the manipulation input by the game player so as to provide a game apparatus capable of enhancing game player's enjoyment.

What is claimed is:

1. A game apparatus, which may travel along a floor upon which the game apparatus and a game player are independently positioned, said travel occurring uncoupled from and independent of position and/or motion of the game player, the apparatus comprising:
   an apparatus body uncoupled from and independent of game player position;
   a manipulation input unit, provided on the apparatus body, which accepts an external manipulation to make progress on a game;
   a manipulation guide unit which provides a guidance of prompting to a game player to perform a manipulation with said manipulation input unit;
   a movement mechanism unit at the apparatus body which provides a positional displacement to the game apparatus as a whole along a plane of the floor independent of the game player, wherein said movement mechanism unit is configured to move the game apparatus as a whole along the plane of the floor in at least either one of a lateral turning motion or a traveling motion with respect to the game player positioned in said single plane;

a drive control section which controls drive of said movement mechanism unit; and a control instruction section which generates a given drive control instruction during game play and outputting the generated drive control instruction to said drive control section.

2. The game apparatus as defined in claim 1, wherein said control instruction section comprises a manipulation-input-state determination section which determines a state of manipulation according to a manipulation input by the game player through said manipulation input unit, and outputs a drive control instruction corresponding to a result of said determination result, to said drive control section.

3. The game apparatus as defined in claim 2, wherein said manipulation-input-state determination section is adapted to pre-store a plurality of motion patterns for the positional displacement, and, after selecting a given motion pattern from said plurality of motion patterns based on the determination result on the state of manipulation input to said manipulation input unit, outputs the selected motion pattern to said drive control section as the drive control instruction.

4. The game apparatus according to claim 2, further comprising a base segment having said manipulation input unit, wherein said movement mechanism unit is provided in said base segment.

5. The game apparatus as defined in claim 4, wherein said movement mechanism unit includes a plurality of rotatable members which are attached to a bottom surface of said base segment, and a drive source for rotationally moving at least one of said rotatable members.

6. The game apparatus according to claim 4, further comprising a top segment disposed in an upper portion of said base segment and turnably supported relative to said base segment, wherein said manipulation-input-state determination section is operable, when the state of manipulation input has a given state, to give a turning instruction to said top segment.

7. The game apparatus as defined in claim 6, wherein said top segment is adapted to turn about an approximately vertical axis.

8. The game apparatus according to claim 2, further comprising a detection section for detecting a game player around a body of the apparatus, wherein said manipulation-input-state determination section is operable to output the drive control instruction to said drive control section according to a detected direction and the state of manipulation input.

9. The game apparatus as defined in claim 1, wherein said control instruction section includes a game-status determination section for determining a game status, and outputting a drive control instruction corresponding to a result of said determination, to said drive control section.

10. The game apparatus as defined in claim 9, wherein said game-status determination section is adapted to pre-store a plurality of motion patterns corresponding to the game status, and, after selecting a given motion pattern from said plurality of motion patterns based on the determination result on the game status, output the selected motion pattern to said drive control section as the drive control instruction.

11. The game apparatus as defined in claim 9 or 10, wherein said movement mechanism unit is operable to provide at least either one of a turning motion and a traveling motion on a single plane, to said manipulation input unit as a motion for positional displacement.

12. The game apparatus according to claim 9, further comprising a base segment having said manipulation input unit, wherein said movement mechanism unit is provided in said base segment.

13. The game apparatus as defined in claim 12, wherein said movement mechanism unit includes a plurality of rotatable members which are attached to a bottom surface of said base segment, and a drive source for rotationally moving at least one of said rotatable members.

14. The game apparatus according to claim 12, further comprising a top segment disposed in an upper portion of said base segment and turnably supported relative to said base segment, wherein said game-status determination section is operable, when the game status has a given state, to give a turning instruction to said top segment.

15. A game apparatus for challenging a game player's ability to perform a manipulation input to the game apparatus, comprising:

an apparatus body;

a manipulation input unit, provided on the apparatus body, which accepts an external physical manipulation by the game player to make progress on a game;

a manipulation guide unit, also provided on the apparatus body, which provides a guidance of prompting the game player to perform the external physical manipulation with the manipulation input unit;

a movement mechanism unit which provides a positional displacement to the game apparatus with respect to a game player's position in such a manner that said manipulation input unit together with said manipulation guide unit and said apparatus body are movable independent of the game player's position, wherein said positional displacement serves to challenge the game player's ability to apply the external physical manipulation to the manipulation guide unit;

a drive control section which controls the drive of said movement mechanism unit; and a control instruction section which generates a given drive control instruction during game play and outputting the generated drive control instruction to said drive control section.

16. A game apparatus, comprising:

an apparatus body;

a manipulation input unit configured to accept an external manipulation to effect game progress, said manipulation unit being fixed to the apparatus body;

a manipulation guide unit provided on the apparatus body and configured so as to be operable to prompt a game player to perform a particular manipulation input with the manipulation input unit;

a movement mechanism unit configured to move the apparatus body as a whole without moving the game player, movement of the game apparatus being independent of position and/or motion of the game player, wherein the player's ability to respond to said prompt and perform said external manipulation is challenged by timing said movement of the game apparatus with said prompt;

a drive control section configured to control drive of said movement mechanism unit; and a control instruction section configured to generate a given drive control instruction during game play and to output the given drive control instruction to said drive control section.

17. A game apparatus which travels along a floor upon which the game apparatus is positioned, wherein position of the game apparatus is not coupled to game player position, the apparatus comprising:

a base portion;

a movement mechanism unit at the base portion which effects positional displacement of the game apparatus as a whole along the floor independent of the game player's position;

a drive control section which controls drive of said movement mechanism unit;

a control instruction section which generates a given drive control instruction during game play and outputting the generated drive control instruction to said drive control section;

a top portion;

a turnable support mechanism which moves the top portion relative to the base portion;

a top portion motion control section which generates a given control during game play responded to by the turnable support mechanism to effect said moving of the top portion relative to the base portion to increase level of difficulty of game play;

a manipulation input unit at the base portion which accepts an external manipulation from the game player in the course of a game;

a manipulation guide unit at the top portion which provides visual guidance during game play prompting the game player to perform a manipulation input at said manipulation input unit; and wherein moving of the top portion relative to the base portion by the turnable support mechanism may be effected concurrently with the positional displacement of the game apparatus as a whole by the movement mechanism unit at the base portion.

18. The game apparatus of claim 17, further comprising:
a plurality of sensors having directional orientation for identifying presence of the game player around the base portion.

19. The game apparatus of claim 17, wherein the movement mechanism unit at the base portion is capable of each of turning movements and travelling movements of the game apparatus as a whole relative to the floor.

20. The game apparatus of claim 17, further comprising a sensor for determining absolute orientation of the game apparatus relative to the floor.

21. The game apparatus of claim 17, wherein the movement mechanism unit at the base portion comprises rolling surfaces for contacting the floor and which provide support for the game apparatus to maintain an upright posture while travelling along the floor.

22. The game apparatus of claim 17, wherein the manipulation guide unit comprises a display screen which has visibility impacted by an angular orientation upon which the game player views the display screen.

23. The game apparatus of claim 17, in combination with a position detection system, and further comprising a sensor and encoder for determining absolute orientation of the game apparatus relative to the floor;

wherein the position detection system, comprises:
a receiver and transmitter at the game apparatus; and
a pickup and determining unit for determining spot coordinate information based on information received from the game apparatus transmitter; and
wherein the game apparatus receiver receives from the position detection system a correction to the encoder for use in determining absolute orientation of the game apparatus.

24. The game apparatus of clam 17, which travels along a stationary plane of the floor that also supports a game player, the game apparatus moving along the stationary plane uncoupled from and independent of position and/or movement of the game player.

* * * * *

UNITED STATES PATENT AND TRADEMARK OFFICE
CERTIFICATE OF CORRECTION

PATENT NO.         : 8,075,400 B2                                         Page 1 of 1
APPLICATION NO.    : 11/632022
DATED              : December 13, 2011
INVENTOR(S)        : Shigenobu Matsuyama et al.

It is certified that error appears in the above-identified patent and that said Letters Patent is hereby corrected as shown below:

On the Title Page

Item (73) Assignee:

Change "Konami Digitalk Entertainment Co., Ltd., Tokyo (JP)"

to

"Konami Digital Entertainment Co., Ltd., Tokyo (JP)"

Signed and Sealed this
Fourth Day of September, 2012

David J. Kappos
*Director of the United States Patent and Trademark Office*